(12) United States Patent
Ando et al.

(10) Patent No.: US 7,411,480 B2
(45) Date of Patent: Aug. 12, 2008

(54) INFORMATION PROCESSING APPARATUS, INFORMATION PROCESSING CONTROL SYSTEM, CONTROL METHOD FOR INFORMATION PROCESSING APPARATUS, CONTROL PROGRAM FOR INFORMATION PROCESSING APPARATUS RECORDING MEDIUM ON WHICH CONTROL PROGRAM FOR INFORMATION PROCESSING APPARATUS IS RECORDED

(75) Inventors: Tanichi Ando, Kyoto (JP); Hisashi Takeuchi, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 157 days.

(21) Appl. No.: 10/594,390

(22) PCT Filed: Mar. 9, 2005

(86) PCT No.: PCT/JP2005/004099

§ 371 (c)(1),
(2), (4) Date: Sep. 27, 2006

(87) PCT Pub. No.: WO2005/098776

PCT Pub. Date: Oct. 20, 2005

(65) Prior Publication Data

US 2007/0176778 A1 Aug. 2, 2007

(30) Foreign Application Priority Data

Mar. 31, 2004 (JP) .............................. 2004-106946

(51) Int. Cl.
*B60R 25/00* (2006.01)
*G05B 19/00* (2006.01)
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)

(52) U.S. Cl. .................. 340/5.72; 340/5.1; 340/5.2; 340/5.6; 340/426.13

(58) Field of Classification Search .............. 340/426.1, 340/426.13, 5.1, 5.2, 5.3, 5.6, 5.61, 5.62, 340/5.7, 5.72
See application file for complete search history.

(56) References Cited

U.S. PATENT DOCUMENTS 7,071,822 B2 * 7/2006 Ando et al. ............... 340/545.1

(Continued)

FOREIGN PATENT DOCUMENTS

JP 2000-192701 7/2000

(Continued)

*Primary Examiner*—George A Bugg
*Assistant Examiner*—Travis R Hunnings
(74) *Attorney, Agent, or Firm*—Foley & Lardner LLP

(57) ABSTRACT

A security apparatus (2) monitors movement of users carrying security controllers (3a) through (3c) into and out of a security area (50), and controls security operations. The security apparatus (2) includes a communication unit (4) for communicating with each of the security controllers (3a) through (3c) and obtaining position information on the respective security controllers (3a) through (3c), a storage unit (11) for storing a security controller monitoring table (30), and a left-controller determining section (26) for judging whether any of the security controllers (3a) through (3c) has been left within the security area (50) and determining whether setting or canceling of the security mode is commanded automatically or based on the input operations by the users.

20 Claims, 10 Drawing Sheets

U.S. PATENT DOCUMENTS

| | | | |
|---|---|---|---|
| 7,212,103 B2 * | 5/2007 | Oyagi et al. | ................ 340/429 |
| 2003/0222787 A1 | 12/2003 | Shimamoto et al. | |

FOREIGN PATENT DOCUMENTS

| JP | 2000-213216 | 8/2000 |
|---|---|---|
| JP | 2002-304686 | 10/2002 |
| JP | 2003-027790 | 1/2003 |
| JP | 2003-027791 | 1/2003 |
| JP | 2003-041825 | 2/2003 |
| JP | 2003-106019 | 4/2003 |
| JP | 2003-221954 | 8/2003 |
| JP | 2003-301638 | 10/2003 |
| JP | 2004-013191 | 1/2004 |

* cited by examiner

FIG. 5

| TIME<br>SECURITY CONTROLLER | 0:00<br>(PRESENT TIME) | 0:20 |
|---|---|---|
| SECURITY CONTROLLER 3a | RADIO WAVE INTENSITY 3.5 | RADIO WAVE INTENSITY 2.0 |
| SECURITY CONTROLLER 3b | RADIO WAVE INTENSITY 3 | RADIO WAVE INTENSITY 2.3 |
| SECURITY CONTROLLER 3c | RADIO WAVE INTENSITY 10 | RADIO WAVE INTENSITY 10 | ively used in some cases when the security
INFORMATION PROCESSING APPARATUS, INFORMATION PROCESSING CONTROL SYSTEM, CONTROL METHOD FOR INFORMATION PROCESSING APPARATUS, CONTROL PROGRAM FOR INFORMATION PROCESSING APPARATUS RECORDING MEDIUM ON WHICH CONTROL PROGRAM FOR INFORMATION PROCESSING APPARATUS IS RECORDED

TECHNICAL FIELD

The present invention relates to an information processing apparatus which sets a security condition when a person carrying an information transmission/reception device moves from the inside of a predetermined area to the outside and cancels the security condition when the person carrying the information transmission/reception device moves from the outside of the predetermined area to the inside.

BACKGROUND ART

Currently, the number of various crimes such as robbery of articles placed inside cars and illegal entry of another's residence has been increasing, and the consciousness of people for crime prevention has been growing. To meet the demand generated with the increase in consciousness for crime prevention, a variety of crime-prevention goods have been developed.

For example, a security mechanism control system which locks and unlocks doors of a vehicle has been developed as an example of a security mechanism control system for a vehicle using radio waves. For example, according to security mechanism control systems disclosed in Patent Reference No. 1 (JP-A-2003-27790, publication date: Jan. 29, 2003), Patent Reference No. 2 (JP-A-2003-27791, publication date: Jan. 29, 2003), and Patent Reference No. 3 (JP-A-2003-301638, publication date: Oct. 24, 2003) or other references, a user can automatically lock or unlock a vehicle only by carrying a portable device and easily check that the vehicle has been locked. In these security mechanism control systems, the portable device transmits signals and a main device receives the signals. Thus, the user carrying the portable device can automatically unlock the vehicle only by approaching the vehicle and lock the vehicle by moving away from the vehicle.

In such a conventional type of security mechanism control system which automatically locks and unlocks doors of a vehicle when the user carrying the portable device gets into and out of the vehicle, a plurality of portable devices are prepared and separately used in some cases when the security target such as a vehicle is used by a plurality of users.

When the plural portable devices are used, however, the possibility that any of the portable devices is left inside the vehicle increases. If any of the plural portable devices is left inside the vehicle, the following problem occurs according to the conventional system.

Since the left portable device is located inside the vehicle, the main device determines that the user as the owner of the portable device is still staying inside the vehicle and does not automatically set the security condition for the vehicle in some cases. When this occurs, the user does not notice that the portable device has been left inside the vehicle and leaves the vehicle in the non-security condition.

In another case, each of the plural users has his/her portable device and the security mechanism control system automatically locks the vehicle when any of the plural users gets off the vehicle. In still another case, the user locks the vehicle by directly giving a locking command to the vehicle.

In either of these cases, the vehicle is automatically unlocked by the approach of a person other than the users when any of the portable devices is left inside the vehicle. This is because the requirements that a person is approaching the vehicle and that the portable device is positioned near the main device are satisfied, and therefore the locking condition set for the vehicle is automatically cancelled.

Moreover, when the plural portable devices are used in the system, such a case can happen where a user carrying the portable device moves away from the main device but another user stays near the main body.

In this case, the user leaving the vehicle considers that the vehicle has been automatically locked, but in reality the vehicle is not locked since the other user stays near the main device. Thus, the operation of the system depends on the behaviors of the users. There is a possibility that the requirement for unlocking is satisfied while the requirement for locking is satisfied. The above case is a result of the operation selected by the main body which has determined that the vehicle should be unlocked.

Therefore, when the plural portable devices are used, the main device does not always set the condition as the user desires.

According to the structures shown in Patent Reference Nos. 1 through 3, when the portable device left near the main body or carried by the user is positioned near the main body, the problems mentioned above cannot be solved. This is because the system does not have means for determining whether the portable device near the main body is the device left behind or the portable device carried by the user, nor means for appropriately notifying the user of the result of the determination.

In the structures shown in Patent Reference Nos. 1 through 3, therefore, in case of the plural portable devices are used, the vehicle cannot be locked or the locked condition is cancelled against the user's intension while the user is not noticing this situation.

DISCLOSURE OF THE INVENTION

The invention has been developed to solve the above problems. It is an object of the invention to provide a technique which can prevent erroneous operation for setting a security condition which may be caused when any of plural information transmission/reception devices registered in an information processing apparatus is left behind.

In order to achieve the above object, an information processing apparatus according to the invention monitors movement of users each carrying an information transmission/reception device into and out of a predetermined area and controls security operations for the predetermined area. The information processing apparatus is characterized by including: a communication unit for communicating with each of the plural information transmission/reception devices; a position recognition unit for acquiring position information on the respective positions of the plural information transmission/reception devices; a record storage unit for storing position record information showing a record of the position information for a predetermined period; position judging means for judging whether each of the information transmission/reception devices is located within the predetermined area based on the position information; first security command means for commanding setting or canceling of a security condition based on the judgment result given by the position judging means; second security command means for receiving information on the requirement for setting or canceling of the security condition from the information transmission/reception devices through the communication unit, and for commanding setting or canceling of the security condition; and security condition selecting means for selecting either the command by the first security command means or the command by the second security command means based on the position record information.

The security condition refers to a condition where preventive actions such as warning, threatening, and locking are given to a person who is not a specified user and approaches the predetermined area. The information processing apparatus according to the invention switches the setting of the security condition in accordance with the presence or absence of the person carrying the information transmission/reception device within the predetermined area, and communicates with the information transmission/reception devices through the communication unit.

Since the position recognition unit and the position judging means are provided, the information processing apparatus can recognize the positions of the respective information transmission/reception devices and determine whether the respective information transmission/reception devices are located with the predetermined area.

Since the record storage unit is provided, the information processing apparatus can recognize the movements of the respective information transmission/reception devices, and determine whether the information transmission/reception devices have moved from the inside of the predetermined area to the outside or from the outside of the predetermined area to the inside, or are remaining at fixed spots within the predetermined area.

Since the security condition selecting means is provided, the information processing apparatus can switch the setting between the security condition and non-security condition in an appropriate manner automatically or in accordance with the commands inputted by the user based on the position record information such as information on the presence or absence of the information transmission/reception device within the predetermined area, and the movement of the information transmission/reception device into or out of the predetermined area or staying at a fixed position within the predetermined area.

Thus, when any of the information transmission/reception devices is left within the predetermined area, for example, the information processing apparatus can select one of the following three options: automatically setting the non-security condition when any other information transmission/reception device moves into the predetermined area; keeping the security mode all the time; and notifying the information transmission/reception device having entered the predetermined area and determining which of the security condition and the non-security condition should be selected in accordance with the command from the information transmission/reception device.

Accordingly, the information processing apparatus can appropriately determine whether the security condition should be set or canceled automatically based on the relative positions of the respective information transmission/reception devices and the actions of these devices within a predetermined period or in accordance with the command from the information transmission/reception devices.

In an example of the information processing apparatus having the above structure according to the invention, personal behavior monitoring means for detecting movement of a person into and out of the predetermined area is further included. Additionally, the security condition selecting means selects either of the commands based on the detection result obtained from the personal behavior monitoring means as well as the position record information.

In this case, since the personal behavior monitoring means is provided, the information processing apparatus can detect the positions and actions of the users as well as the positions of the devices carried by the users. Thus, the information processing apparatus can recognize the positions and actions of the users carrying the information transmission/reception devices with high accuracy.

In an example of the information processing apparatus having the above structure according to the invention, the security condition selecting means selects the command given by the first security command means when it is determined that any of the information transmission/reception devices remains within the predetermined area for a predetermined period and that any other of the information transmission/reception devices moves from the inside of the predetermined area to the outside of the predetermined area based on the position record information. Additionally, the security condition selecting means selects the command given by the second security command means when it is determined that any of the information transmission/reception devices remains within the predetermined area for a predetermined period and that any other of the information transmission/reception devices moves from the outside of the predetermined area to the inside of the predetermined area based on the position record information.

In this case, when any of the information transmission/reception devices has been located within the predetermined area for the predetermined period, the information processing apparatus can determine the corresponding information transmission/reception device as the information transmission/reception device which has not been carried by the user, i.e., has been left behind. Since the information processing apparatus selects the command given by the first security command means when the information transmission/reception device remains within the predetermined area for the predetermined period as above, the security condition can be automatically set when any other information transmission/reception device moves out of the predetermined area.

Accordingly, the information processing apparatus can prevent continuation of the non-security condition which may be caused when any of the information transmission/reception devices has been left within the predetermined area.

Moreover, when any of the information transmission/reception devices has been located within the predetermined area for the predetermined period as the left information transmission/reception device and any other information transmission/reception device enters the predetermined area, the information processing apparatus can cancel the security condition set for the predetermined area in accordance with the command given by the second security command means, i.e., the command inputted by the user.

Thus, when any of the information transmission/reception devices has been left within the predetermined area and a person not carrying any information transmission/reception device enters the predetermined area, for example, the information processing apparatus do not cancel the security condition for the combined reasons that the information transmission/reception device has been left behind and that the person not carrying any information transmission/reception device approaches, that is, by erroneous recognition that the proper user carrying the device approaches.

In an example of the information processing apparatus having the above structure according to the invention, the security condition selecting means includes response requiring means for requiring the information transmission/reception devices to give response inputted by the users of the information transmission/reception devices. When it is determined that any of the information transmission/reception devices remains within the predetermined area for a predetermined period based on the position record information, the response requiring means requires the corresponding information transmission/reception device positioned within the predetermined area to give the input response. In the case where the input response is not given, (1) the security condition selecting means selects the command given by the first security command means when it is determined that the information transmission/reception devices remains within the predetermined area for the predetermined period and that any other of the information transmission/reception devices moves from the inside of the predetermined area to the outside of the predetermined area, and (2) the security condition selecting means selects the command given by the second security command means when it is determined that the information transmission/reception devices remains within the predetermined area for the predetermined period and that any other of the information transmission/reception devices moves from the outside of the predetermined area to the inside of the predetermined area based on the position record information.

Thus, the information processing apparatus further requires the input response from the information transmission/reception device left within the predetermined area for the predetermined period to determine whether the information transmission/reception device located within the predetermined area is the device carried by the user or not with high accuracy. When no input response is given in response to the requirement for the input response, it is determined that the information transmission/reception device located within the predetermined area for the predetermined period is the left information transmission/reception device which is not carried by the user.

When it is determined that the information transmission/reception device not carried by the user is located within the predetermined area and any other information transmission/reception device moves out of the predetermined area, the command given by the first security command means is adopted. Thus, the information processing apparatus according to the invention can automatically set the security condition for the predetermined area when other information transmission/reception device moves out of the predetermined area. Accordingly, the information processing apparatus can prevent continuation of the non-security condition due to the existence of the information transmission/reception device left within the predetermined area, for example.

When it is determined that the information transmission/reception device is located within the predetermined area and any other information transmission/reception device moves into the predetermined area, the information processing apparatus can cancel the security condition set for the predetermined area based on the command given by the second security command means, i.e., the command inputted by the user. Thus, the information processing apparatus can prevent erroneous recognition as the proper user carrying the device and canceling of the security condition for the combined reasons of the existence of the left information transmission/reception device and the existence of the person not carrying the information transmission/reception device.

In an example of the information processing apparatus having the above structure according the invention, security condition notifying means for giving the information on the command selected by the security condition selecting means to each of the plural information transmission/reception devices through the communication unit is further included.

Since the security condition notifying means is provided, the information processing apparatus can notify the user about the current state of the security condition set for the predetermined area.

Thus, the user can recognize whether the security condition set by the information processing apparatus is appropriate or not through the information transmission/reception device, and can give a command for changing the setting if the setting is inappropriate.

Accordingly, the information processing apparatus can reflect the intension of the user while setting or canceling the security condition.

In order to achieve the above object, an information processing apparatus according to the invention sets or cancels a security condition within a predetermined security area in accordance with positions of information transmission/reception devices carried by users who moves into and out of the predetermined area. The information processing apparatus is characterized by comprising: position judging means for receiving position information showing the respective positions of the information transmission/reception devices and for judging whether the information transmission/reception devices are located within the predetermined area; a record storage unit for storing position record information showing records of the position information per a certain period; and security condition selecting means for judging whether the information transmission/reception devices are positioned within the predetermined area for a predetermined period based on the position record information, and for determining that any of the information transmission/reception devices remaining within the predetermined area for the predetermined period is the information transmission/reception device having been left within the predetermined area.

In this case, the information processing apparatus according to the invention can set or cancel the security condition for the predetermined area in accordance with the positions of the information transmission/reception devices.

Since the position judging means is provided, the information processing apparatus can determine whether the information transmission/reception devices are located within the predetermined area. Moreover, since the position record information as the records of the position information on the respective information transmission/reception devices is stored, the security condition selecting means can determine whether the information transmission/reception device remaining within the predetermined area for the predetermined period as the device left within the predetermined area based on the position record information.

Thus, the information processing apparatus according to the invention can judge whether the information transmission/reception devices positioned within the predetermined area are the devices having been left behind.

Accordingly, the information processing apparatus according to the invention can prevent erroneous operation such as continuation of the non-security condition due to the existence of the information transmission/reception device left within the predetermined area, for example.

In a preferable example of the information processing apparatus having the above structure according to the invention, personal behavior monitoring means for detecting movement of a person into and out of the predetermined area is further included. Additionally, the security condition selecting means judges whether the information transmission/reception devices are left within the predetermined area based on the detection result obtained from the personal behavior monitoring means as well as the position record information.

Since the personal behavior monitoring means is provided, the information processing apparatus according to the invention can detect the positions and actions of the users as well as the positions of the devices carried by the users. Thus, the positions and actions of the users carrying the information transmission/reception devices can be recognized with high accuracy.

In a preferable example of the information processing apparatus having the above structure according to the invention, notifying means for providing the information on the information transmission/reception device determined as the device having been left within the predetermined area by the security condition selecting means to the information transmission/reception devices positioned out of the predetermined area is further provided.

In this case, since the notifying means is provided, the information processing apparatus according to the invention can notify the user carrying the information transmission/reception device about the information transmission/reception device left within the predetermined area.

Since the user recognizes the existence of the left information transmission/reception device in advance, the user can deal with any setting of the security condition for the predetermined area even when the setting is different from the ordinary setting due to the existence of the left information transmission/reception device. For example, when the user enters the predetermined area, the user can avoid receiving threats which may be unexpectedly given.

In an example of the information processing apparatus having the above structure according to the invention, when at least one of the plural information transmission/reception devices positioned within the predetermined area moves from the inside of the predetermined area to the outside of the predetermined area, the security condition selecting means requires response from the information transmission/reception devices positioned within the predetermined area for the predetermined period and judges the information transmission/reception device from which no response is given as the information transmission/reception device having been left behind.

More specifically, when the information transmission/reception device is carried by the user, this device can respond to the response requirement given from the security condition selecting means. However, when the information transmission/reception device is the device left by the user, this device cannot respond to the response requirement. Thus, the security condition selecting means determines that the information transmission/reception device which is positioned within the predetermined area for the predetermined period and from which no response is received as the information transmission/reception device having been left behind.

Accordingly, the left information transmission/reception device can be specified with high precision by the method of response requirement.

In an example of the information processing apparatus having the above structure according to the invention, when the security condition selecting means determines that any of the information transmission/reception devices has been left within the predetermined area, the security condition selecting means does not cancel the security condition until receiving a command for canceling the security condition given from any other information transmission/reception device.

In this case, when it is determined that the left information transmission/reception device has been located within the predetermined area, the security condition is not set or canceled in accordance with the positions of other information transmission/reception devices but based on the command for canceling the setting directly given by the user using other information transmission/reception device.

Accordingly, the information processing apparatus according to the invention allows only the proper users carrying the information transmission/reception devices to enter the predetermined area.

An information processing control system according to the invention includes the information processing apparatus having the above structure, and information transmission/reception devices for communicating with the information processing apparatus.

A control method of an information processing apparatus according to the invention monitors movement of users each carrying an information transmission/reception device into and out of a predetermined area and controls security operations for the predetermined area. The control method is characterized by including: a communication step for communicating with each of the plural information transmission/reception devices; a position recognition step for acquiring position information on the respective positions of the plural information transmission/reception devices; a record storage step for storing position record information showing a record of the position information for a predetermined period; a position judging step for judging whether each of the information transmission/reception devices is located within the predetermined area based on the position information; a first security command step for commanding setting or canceling of a security condition based on the judgment result given in the position judging step; a second security command step for receiving information on the requirement for setting or canceling of the security condition The information processing apparatus may be constituted by a computer. In this case, a control program for the information processing apparatus under which the computer as the information processing apparatus operates to provide functions of the above respective means is recorded on a recording medium so that the control program can be read by the computer, and this recording medium is included within the scope of the invention.

As aforementioned, the information processing apparatus according to the invention includes: the communication unit for communicating with each of the plural information transmission/reception devices; the position recognition unit for acquiring position information on the respective positions of the plural information transmission/reception devices; the record storage unit for storing position record information showing a record of the position information for a predetermined period; the position judging means for judging whether each of the information transmission/reception devices is located within the predetermined area based on the position information; the first security command means for commanding setting or canceling of the security condition based on the judgment result given by the position judging means; the second security command means for receiving information on the requirement for setting or canceling of the security condition from the information transmission/reception devices through the communication unit, and for commanding setting or canceling of the security condition; and the security condition selecting means for selecting either the command by the first security command means or the command by the second security command means based on the position record information.

Additionally, as aforementioned, the control method of the information processing apparatus according to the invention includes: the communication step for communicating with each of the plural information transmission/reception devices; the position recognition step for acquiring position information on the respective positions of the plural information transmissionlreception devices; the record storage step for storing position record information showing a record of the position information for a predetermined period; the position judging step for judging whether each of the information transmission/reception devices is located within the predetermined area based on the position information; the first security command step for commanding setting or canceling of the security condition based on the judgment result given in the position judging step; the second security command step for receiving information on the requirement for setting or canceling of the security condition from the information transmission/reception devices through the communication unit, and for commanding setting or canceling of the security condition; and the security condition selecting step for selecting either the command by the first security command step or the command by the second security command step based on the position record information.

Thus, the information processing apparatus can determine whether the security condition is appropriately set or canceled automatically based on the relative positions of the respective information transmission/reception devices and the actions of these devices within the predetermined period or in accordance with the command given from the information transmission/reception devices.

BRIEF DESCRIPTION OF THE DRAWINGS

FIG. 1 is a block diagram schematically showing an example of a structure of a security apparatus in an embodiment according to the invention.

FIG. 2 illustrates a relationship between a person carrying a security controller 3 and a person not carrying any security controller in a security area.

FIG. 3 illustrates a relationship between a person carrying the security controller 3 (user) and a person not carrying the security controller 3 in the security area including a car as a security target.

FIG. 4 is a block diagram schematically showing an example of a structure of a security system in this embodiment.

[FIG. 5]
FIG. 5 illustrates an example of information recorded in a security monitoring table in this embodiment.

FIG. 6 is a block diagram schematically showing an example of a structure of a security controller in this embodiment.

FIG. 7 is a flowchart showing an example of a security waiting process performed by the security apparatus in this embodiment.

FIG. 8 is a flowchart showing an example of a security waiting process performed by a security apparatus as a comparison example of this embodiment.

FIG. 9 is a flowchart showing examples of a security process and a security cancel process performed by the security apparatus in this embodiment.

FIG. 10 is a flowchart showing examples of a security process and a security cancel process performed by a security apparatus as a comparison example of this embodiment.

BEST MODE FOR CARRYING OUT THE INVENTION

A car security system (information processing control system) 1 in this embodiment is constituted by a security apparatus (information processing apparatus) 2, and security controllers (information transmission/reception devices) 3a through 3c registered in the security apparatus 2. The system 1 is a crime-prevention system which threatens a person other than proper users who opens or closes a door of a car for which a security condition is set or brings the car into abnormal conditions.

These abnormal conditions of the car are recognized by detecting vibrations and the like generated by the action of opening the trunk of the car, breaking the windshield or the like of the car, removing tires of the car using a jack, or other actions all of which are done by a person other than the proper users.

Figure 2:
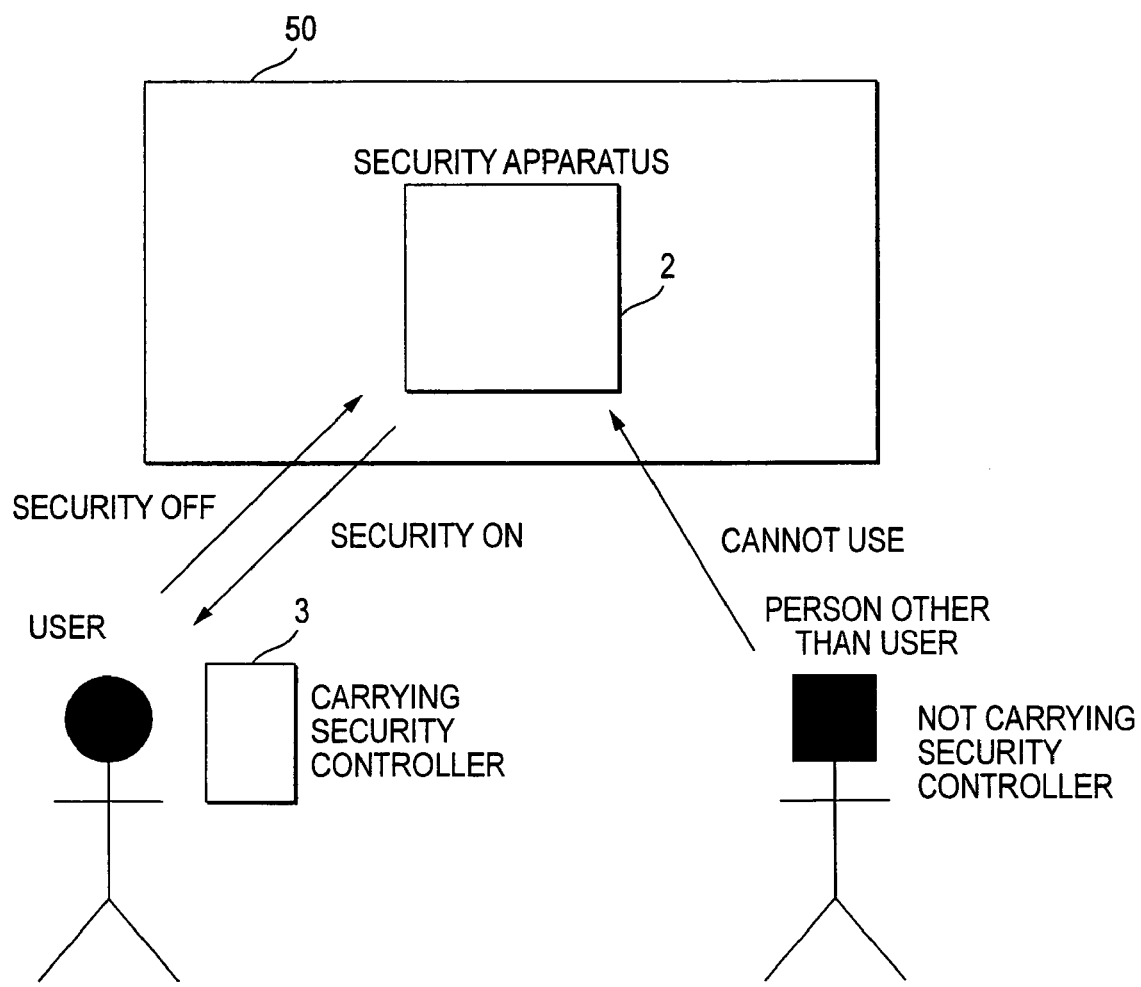
[FIG. 2]
Figure 3:
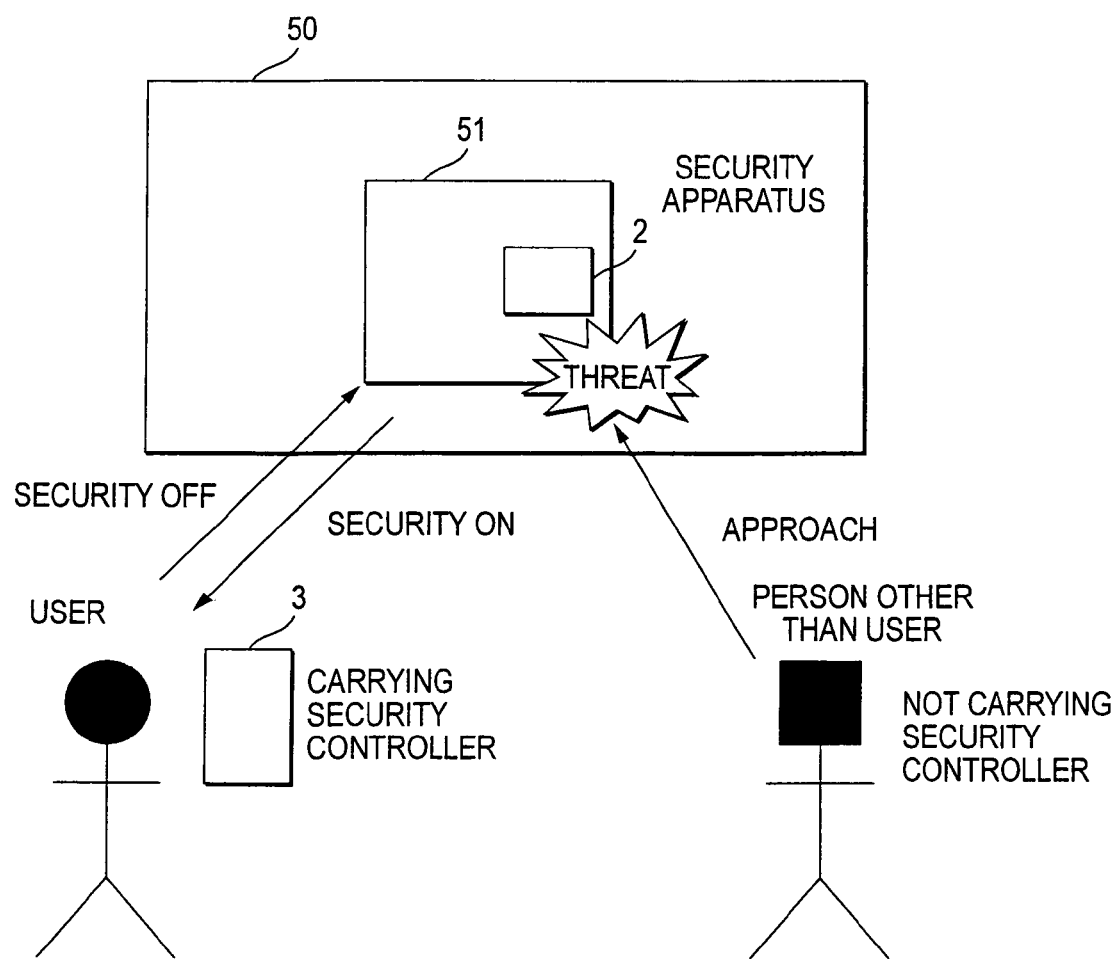
[FIG. 3]

More specifically, in the security system 1 according to this embodiment shown in FIGS. 2 and 3, the security apparatus 2 defines a security area (predetermined area) 50 extending in a predetermined range. FIG. 2 illustrates the relationship between a person (user) carrying a security controller 3 and a person not carrying the security controller 3 in the security area 50. FIG. 3 illustrates the relationship between the person (user) carrying the security controller 3 and the person not carrying the security controller 3 in the security area 50 which includes a car 51 as the security target.

The security area 50 is a region where any person's access to the region is limited so that illegal use of the security target located within the region can be prevented. For example, this region is the area which requires prevention of illegal use or illegal entry of the security target such as a car in parking, a house, a land, a building, an office, a store, a working place, and a working desk.

More specifically, the security system 1 automatically sets a security condition when the user carrying the security controller 3 moves from the inside of the security area 50 to the outside of the security area 50 as illustrated in FIG. 3. The security system 1 automatically cancels the setting of the security condition when the user approaches the car 51 as the security target from the outside of the security area 50.

In this description, an auto-security function refers to a function in which: the security condition is automatically set for the car 51 when the proper user carrying the security controller 3 gets off the car 51 and moves out of the security area 50; and the setting of the security condition for the car 51 is automatically cancelled when the user enters into the security area 50.

The range of the security area 50 is preferably within a circle having a radius of 5 m with its center located at a position of the car as the security target, but is not limited to this range. When the security apparatus 2 is used in busy sections of cities or other areas where a number of people come and go, it is preferable to establish the security area 50 in a range smaller than the 5 m radius range.

The setting and canceling of the security condition for the car can be switched by directly giving commands to the security apparatus 2 through the security controllers 3a through 3c carried by the proper users.

Next, the general structure of the security system 1 is discussed with reference to FIG. 4.

The security system 1 in this embodiment includes the security apparatus 2 mounted on a car, and the three security controllers 3a through 3c registered in the security apparatus 2 such that the security controllers 3a through 3c can communicate with the security apparatus 2. Communication between the security apparatus 2 and the security controllers 3a through 3c is provided using radio waves. The security controllers 3a through 3c also communicate with one another through radio waves.

When it is not necessary to make specific distinction among the security controllers 3a through 3c in this description, they are only referred to as security controllers 3.

Figure 1:
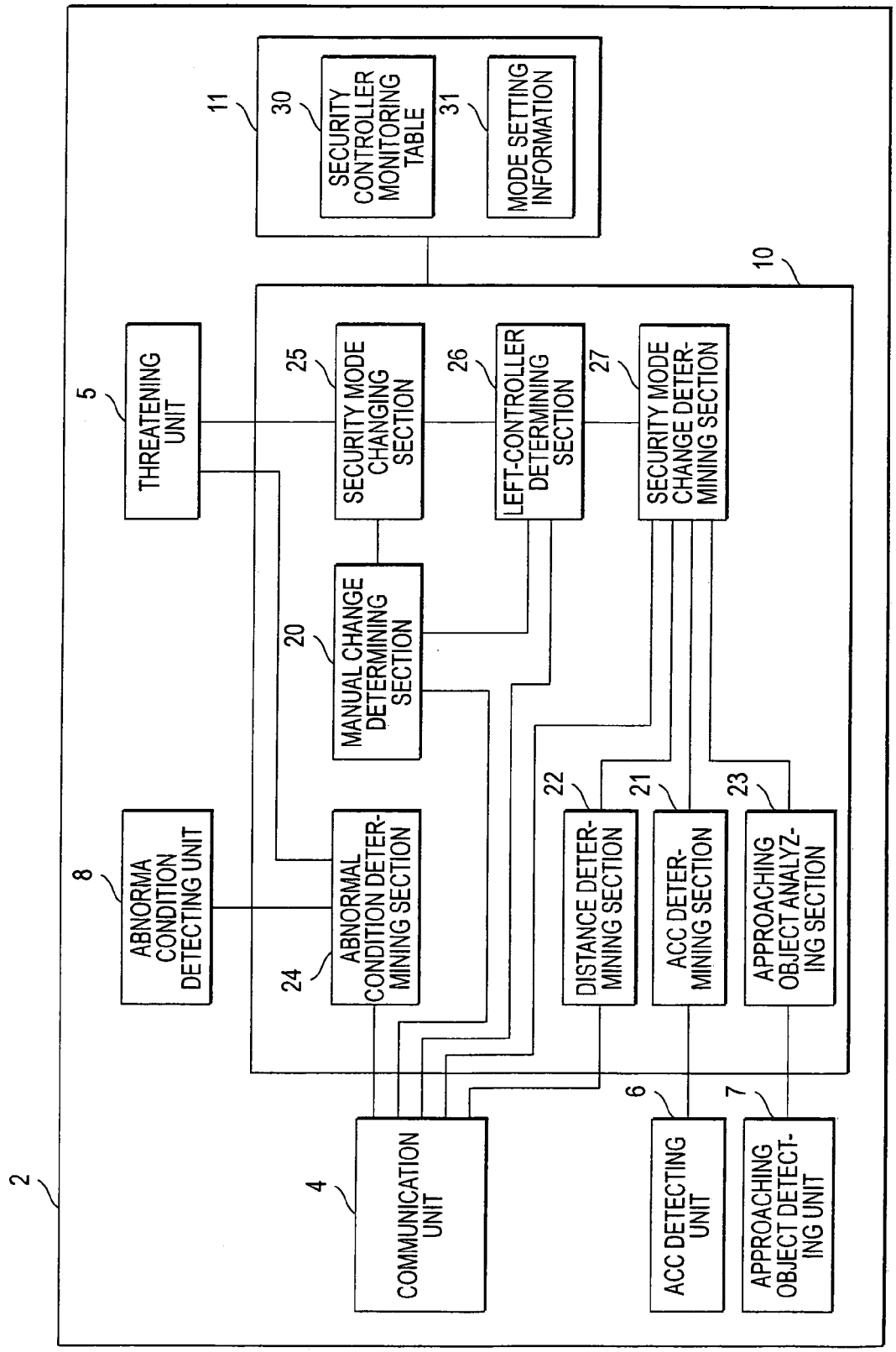
[FIG. 1]

The general structure of the security apparatus 2 in this embodiment is now explained with reference to FIG. 1. FIG. 1 is a block diagram showing an example of a general structure of the security apparatus 2.

The security apparatus 2 in this embodiment has an ACC detecting unit 6, an approaching object detecting unit 7, a communication unit (communication unit, position recognition unit) 4, a threatening unit 5, an abnormal condition detecting unit 8, a storage unit 11, and a security processing unit 10. The security apparatus 2 is connected with an accessory power source (hereinafter referred to as ACC) provided inside the car through the ACC detecting unit 6.

The ACC detecting unit 6 determines whether the supply of ACC power source to which the security apparatus 2 is connected is in the condition of "ON" or "OFF". More specifically, when the car is stopped and the key is pulled out, the ACC power source is switched from "ON", condition to "OFF" condition. Thus, when it is determined that the ACC power source is in the "OFF" condition by the ACC detecting unit 6, it is considered that the car is stopped with the engine turned off. When it is determined that the ACC power source is in the "ON" condition by the ACC detecting unit 6, it is considered that the car is operating.

The ACC detecting unit 6 transmits the detected information on the "ON" or "OFF" condition of the ACC power source to the security processing unit 10.

The approaching object detecting unit (personal behavior monitoring means) 7 detects an object such as a person which approaches the car as the security target for the security system 1. The approaching object detecting unit 7 is constituted by a so-called Doppler sensor which detects a moving object around a vehicle through Doppler effects produced when micro waves are used. When detecting an object approaching the car, that is, a person who enters the security area 50, the approaching object detecting unit 7 transmits this information to the security processing unit 10.

The abnormal condition detecting unit 8 detects abnormal conditions such as vibration given to the car as the security target for the security system 1 from outside. The abnormal conditions include vibration produced when a person other than a proper user tries to open the door of the car, vibration produced when the window of the car is broken, inclination of the car produced when the car is moved upward using a jack to shift the car to somewhere, and other conditions. When detecting any abnormal condition, the abnormal condition detecting unit 8 gives this information to the threatening unit 5.

The communication unit 4 communicates with each of the security controllers 3a through 3c based on commands from the security processing unit 10. For example, the communication unit 4 transmits control signals such as PING commands to each of the security controllers 3a through 3c, and receives commands for setting and/or canceling the security condition or other signals transmitted from each of the security controllers 3a through 3c. The communication unit 4 has a structure capable of receiving radio waves transmitted from the security controllers 3a through 3c so as to obtain information on the respective positions of the security controllers 3a through 3c, details of which structure will be described later. The communication unit 4 transmits the information on radio waves thus received to the security processing unit 10. Similarly, the communication unit 4 transmits commands received from the security controllers 3a through 3c to the security processing unit 10.

When the abnormal condition detecting unit 8 detects abnormal condition of the car as the security target for the security system 1 under the security condition (security mode) set for the car, the threatening unit 5 emits alarm sound or alarm light to threaten a person who approaches the car for illegal actions other than the proper user.

At the time of detection of abnormal condition, not only are threats given by the threatening unit 5, but also information showing detection of abnormal condition may be given to a security center which offers security services through cellular phone communication networks or other means.

The security processing unit 10 provides various controls over the respective components included in the security apparatus 2. The details of the security processing unit 10 will be described later.

The storage unit (record storage unit) 11 is a non-volatile readable and writable storage medium where information required when the security processing unit 10 executes various processes is stored and referred to. The details of the information stored in the storage unit 11 will be described later.

Figure 4:
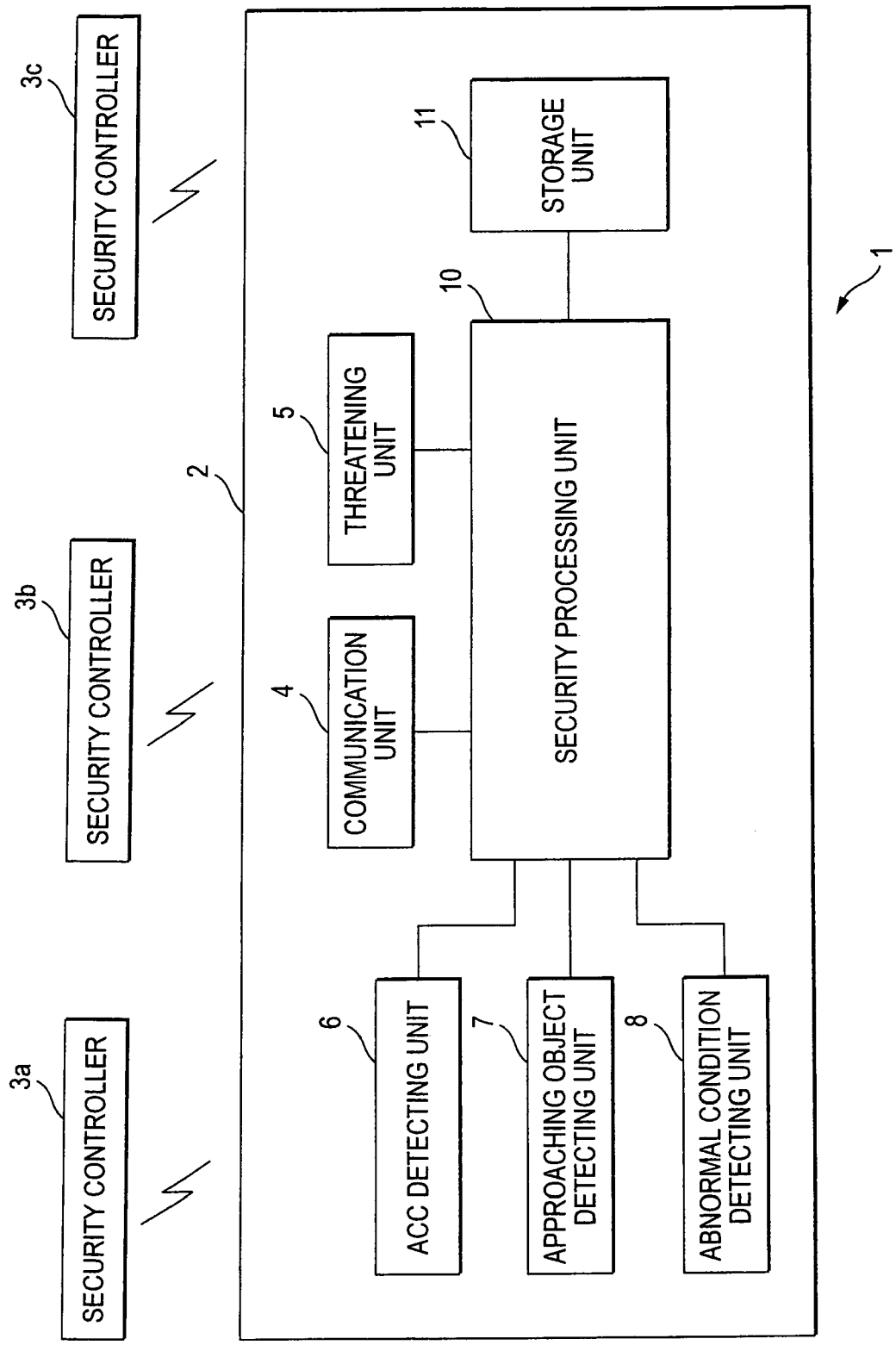
[FIG. 4]

In the function block shown in FIG. 4, the respective components of the communication unit 4, the threatening unit 5, the ACC detecting unit 6, the approaching object detecting unit 7, and the abnormal condition detecting unit 8 are connected with CPU (central processing unit), RAM (random access memory), and ROM (read only memory) through buses. The CPU reads programs stored in the ROM and transfers the programs to the RAM to execute the respective functions under the programs in the RAM.

The storage unit 11 included in the security apparatus 2 may be constituted by a non-volatile recording medium such as flash EEPROM.

While the respective functions in the function block are "provided by calculating means such as CPU which executes processing under program codes stored in a recording medium such as ROM or RAM" in this example, these functions may be provided by hardware which executes similar processing. Alternatively, the functions may be provided by a combination of hardware which conducts a part of the processes and the calculating means which controls the hardware and performs the rest of the processes under program codes. The components in the function block provided as hardware in this example may be provided by a combination of hardware which conducts a part of the processes and the calculating means which controls the hardware and performs the rest of the processes under program codes. The calculating means may be either a single body or plural bodies connected with one another through buses or various communication paths within the apparatus to co-execute processing under program codes.

The program codes which can be directly performed by the calculating means or programs as data for producing program codes by decompression or other processes which will be described later are stored in a recording medium. Then, the recording medium is distributed, or the programs (the program codes or the data) are distributed by a communication device for transmission through wired or wireless communication paths so that the calculating means can perform the programs.

When the programs are transmitted through the communication paths such as buses, for example, signal rows showing the programs are given from and received by each of respective transmission media constituting the communication paths to transmit the programs on the communication paths. At the time of transmission of the signal rows, transmitters may modulate transfer waves using the signal rows showing the programs in such a manner that the signal rows are superposed on the transfer waves. In this case, receivers demodulate the transfer waves to restore the signals rows. At the time of transmission of the signal rows, the transmitters may divide the signal rows as digital data rows into packets. In this case, the receivers combine the received group of packets to restore the signal rows. At the time of transmission of the signal rows, the transmitters may multiplex the signal rows on other signal rows by such methods as time division multiplex, frequency division multiplex, and code division multiplex. In this case, the receivers extract respective signal rows from the multiplexed signal rows to restore the signal rows. In any of these cases, similar results are obtainable as long as the programs can be transmitted through the communication paths.

The recording medium on which the programs are recorded for distribution is preferably removable, but the recording medium after distribution of the programs may be either removable or not removable. The recording medium maybe either rewritable (writable) or not rewritable, and either volatile or not volatile, and may be provided by any recording methods and recording forms as long as programs are stored. Examples of the recording medium involve tapes such as magnetic tapes and cassette tapes, magnetic disks such as floppy (registered trademark) disks and hard disks, and disks such as CD-ROMs and magneto-optical disks (MO), mini disks (MD), and digital video disks (DVD). The recording medium may be cards such as IC cards and optical cards or semiconductor memories such as mask ROMs, EPROMs, EEPROMs and flash ROMs. Alternatively, the recording medium may be memories equipped within calculating means such as CPU.

The program codes used in this example may be codes for commanding the calculating means to conduct the entire procedures for the respective processes. Alternatively, when basic programs (such as operating systems and libraries) which can be accessed by predetermined procedures and under which programs a part or the entire part of the above respective processes can be executed already exists, a part or the entire part of all the above procedures may be replaced with the basic programs using codes or pointers for commanding the calculating means to access the basic programs.

The forms used for storing the programs in the recording medium may be such forms that the calculating means can access and perform the programs as in the case where the programs are disposed in a real memory. Alternatively, the storing forms may be such forms obtained before disposing the programs in the real memory and after installing the programs in a local recording medium (such as real memory and hard disk) to which the calculating means is always accessible, such forms obtained before installing the programs provided from networks, transferable recording medium or the like in the local recording medium, or other forms. The programs are not limited to object codes after compiling, but may be stored as source codes or intermediate codes produced in the course of interpreting or compiling. In any of the forms for storing the programs in the recording medium, similar results are obtainable when the forms of the programs can be converted into such forms that the calculating means can perform the programs by processes such as decompression of compressed information, decoding of coded information, interpreting, compiling, linking, and disposition in a real memory, or a combination of these processes.

(Structure of Security Processing Unit)

Next, the general structure of the security processing unit 10 is explained.

As illustrated in FIG. 1, the security processing unit 10 as a function block includes an ACC determining section 21, a distance determining section (position judging means) 22, an approaching object analyzing section (personal behavior monitoring means) 23, an abnormal condition determining section 24, a security mode changing section 25, a left-controller determining section (security condition selecting means, response requiring means, security condition notifying means, notifying means) 26, manual change determining section (second security command means) 20, and a security mode change determining section (first security command means) 27.

The manual change determining section 20 determines setting or canceling of the security mode in accordance with the commands sent from the security controllers 3 through the communication unit 4.

The manual change determining section 20 transmits the determination results to the security mode changing section 25.

The ACC determining section 21 judges ON or OFF of the ACC power source based on the information obtained by the ACC detecting unit 6. The ACC determining section 21 transmits the determination results to the security mode change determining section 27.

The distance determining section (position judging means) 22 determines the respective positions of the security controllers 3a through 3c based on the intensities of radio waves received from the security controllers 3a through 3c through the communication unit 4. The distance determining section 22 commands the communication unit 4 to give control commands (radio wave requiring commands) for requiring transmission of response radio waves to the security controllers 3a through 3c. The radio wave requiring commands are commands for requiring the security controllers 3 to transmit radio waves to the security apparatus 2, and are constituted by PING commands, for example.

Thus, the communication unit 4 gives the radio wave requiring commands for requiring the security controllers 3 to transmit radio waves based on the commands from the distance determining section 22. The security controllers 3 transmit radio waves to the communication section 4 based on the commands.

The communication unit 4 passes the received radio waves to the distance determining section 22. Then, the distance determining section 22 detects the distances between the security apparatus 2 and the respective security controllers 3 based on the intensities of the radio waves received from the security controllers 3 through the communication unit 4.

More precisely, the distance determining section 22 analyzes and determines whether the security controllers 3a through 3c are positioned within the security area 50, whether any of the security controllers 3a through 3c remains at a fixed spot, or other conditions. This analysis is conducted at predetermined time intervals, and the distance determining section 22 stores the results of analysis as a security controller monitoring table (position record information) 30 in the storage unit 11.

The approaching object analyzing section (personal behavior monitoring means) 23 determines whether any person is approaching the car as the security target based on the result of detection by the approaching object detecting unit 7. The approaching object analyzing section 23 commands the approaching object detecting unit 7 to detect a person or the like approaching the car as the security target based on the commands given from the security mode change determining section 27. The personal behavior monitoring means is constituted by the approaching object detecting unit 7 and the approaching object analyzing section 23.

The abnormal condition determining section 24 determines whether the car as the security target is in the abnormal condition based on the result of detection by the abnormal condition detecting unit 8. When it is determined that the car as the security target is in the abnormal condition, the abnormal condition determining section 24 commands the threatening section 5 to generate warning sounds.

The security mode change determining section 27 determines whether the security system mode of the car as the security target has been changed or not. The security mode change determining section 27 determines whether the security system mode has been changed based on the result of determination by the distance determining section 22 and the approaching object analyzing section 23 while referring to mode setting information 31.

Thus, according to the security apparatus 2 in this embodiment, the security system mode can be automatically changed in accordance with approach of a person and the positions of the security controllers 3. The details of the mode setting information 31 will be described later.

There are three mode types in the security system mode: security mode; non-security mode; and security waiting (security preparation) mode. These modes are defined in the security apparatus 2 in this embodiment.

The security mode is a mode in which the threatening unit 5 generates warning sounds or the like to threat a person who is not a proper user and enters the security area 50 to approach the car as the security target. The non-security mode is a mode in which setting of the security mode is cancelled such that no threat is given to not only the proper user but also any person when he or she enters the security area 50.

The security waiting (security preparation) mode is a mode during the transition period between the security mode and non-security mode. In this mode, the security apparatus 2 determines whether the security mode is shifted to the non-security mode or whether the non-security mode is shifted to the security mode based on the information obtained from the distance determining section 22, the ACC determining section 21, and the approaching object analyzing section 23 or other information.

The security mode change determining section 27 gives commands for changing the setting to the selected mode to the left-controller determining section 26.

The left-controller determining section 26 determines whether any of the security controllers 3a through 3c has been left in the car as the security target. The left-controller determining section 26 commands the security mode changing section 25 to change modes based on the determination whether any of the security controllers 3a through 3c has been left inside the car and the commands for setting the selected mode given from the security mode change determining section 27 or from the manual change determining section 20. The details of the left controller determining process executed by the left-controller determining section 26 will be described later.

When it is determined that any of the security controllers 3a through 3c has been left inside the car, the left-controller determining section 26 gives notification that any of the security controllers 3a through 3c has been left behind to all the security controllers 3 through the communication unit 4.

The security mode changing section 25 changes the mode of the security apparatus 2 based on the commands from the left-controller determining section 26 or commands given by the users through the security controllers 3. More specifically, the security mode changing section 25 sets the security mode or non-security mode for the threatening unit 5. The security mode changing section 25 stores the finally selected mode set for the threatening unit 5 as the mode setting information 31 in the storage unit 11.

The threatening section 5 give threats based on the notification of the abnormal condition received from the abnormal condition determining section 24 only when the security mode is established. Thus, when the threatening unit 5 receives the notification of the abnormal condition from the abnormal condition determining section 24 in the condition where the security condition has been cancelled, the threatening section 5 does not give threats.

Next, the security controller monitoring table 30 and the mode setting information 31 stored in the storage unit 11 are discussed.

The security controller monitoring table 30 is a table where the intensities of respective radio waves transmitted from the security controllers 3a through 3c are recorded in a time-sequential manner as shown in FIG. 5. This table records the intensities of radio waves received by the distance determining section 22 from the security controllers 3a through 3c through the communication unit 4 at fixed intervals. FIG. 5 shows an example of the security monitoring table 30 in this embodiment.

The security apparatus 2 in this embodiment stores the intensities of the radio waves sent from the security controllers 3 in the range from the boundary between the security area 50 and the other areas to the security apparatus 2 in advance (referred to as reference radio wave intensities) Thus, the security apparatus 2 can determine which of the security controllers 3 is located within the security area 50 by referring to the security controller monitoring table 30. Moreover, since both the current intensity and the past intensity of radio waves from the security controllers 3 are recorded, the security apparatus 2 can determine whether the security controllers 3 are moving away from or approaching the car as the security target by checking both the current and past intensities of radio waves.

Furthermore, the intensities of radio waves both inside the car as the security target and outside the car as the security target (the position of the user immediately after the user gets off the car) are stored in advance. Thus, when the security controllers 3 are located within the security area 50, whether the security controllers 3 are positioned inside or outside the car can be determined.

For specifying each of the security controllers 3a through 3c, IDs for the respective security controllers 3 are recorded in the security apparatus 2 in advance. Thus, from which of the security controllers 3 the radio waves having the corresponding intensity are transmitted can be determined by referring to the IDs.

In this embodiment, two radio wave intensities measured at the present time and a predetermined time before are stored in the security controller monitoring table 30. However, the number of the intensities is not limited to two, but may be larger than two with smaller time intervals. In this case, where the security controllers 3 are located and whether the security controllers 3 have been shifted can be detected with higher accuracy, since more accurate information on radio wave intensity changes with elapse of time can be acquired.

In the security apparatus 2, the distance determining section 22 may record only the radio wave intensity immediately before the present time in the radio wave intensities having been measured in the past, and compare the radio wave intensity of the security controllers 3 obtained at the present time through the communication unit 4 with the radio wave intensity measured immediately before the present time and recorded in the monitoring table 30. In this case, the capacity of the memory required for the recording area can be reduced to the minimum since only the radio wave intensity immediately before the present time in the radio wave intensities having been measured in the past is recorded.

According to the security apparatus 2 in this embodiment, the IDs used for specifying the respective security controllers 3 are recorded in advance. However, the security controllers 3 may be specified by using different frequencies for respective radio waves of the security controllers 3. Alternatively, the security controllers 3 may be specified by varying the transmission timing for respective radio waves transmitted from the security controllers 3 to the security apparatus 2 by predetermined amounts.

The mode setting information 31 is information showing the security system mode currently established for the security apparatus 2. The security mode changing section 25 commands the threatening unit 5 to set the selected mode, and records the mode thus established in the mode setting information 31.

(Structure of Security Controller)

Figure 6:
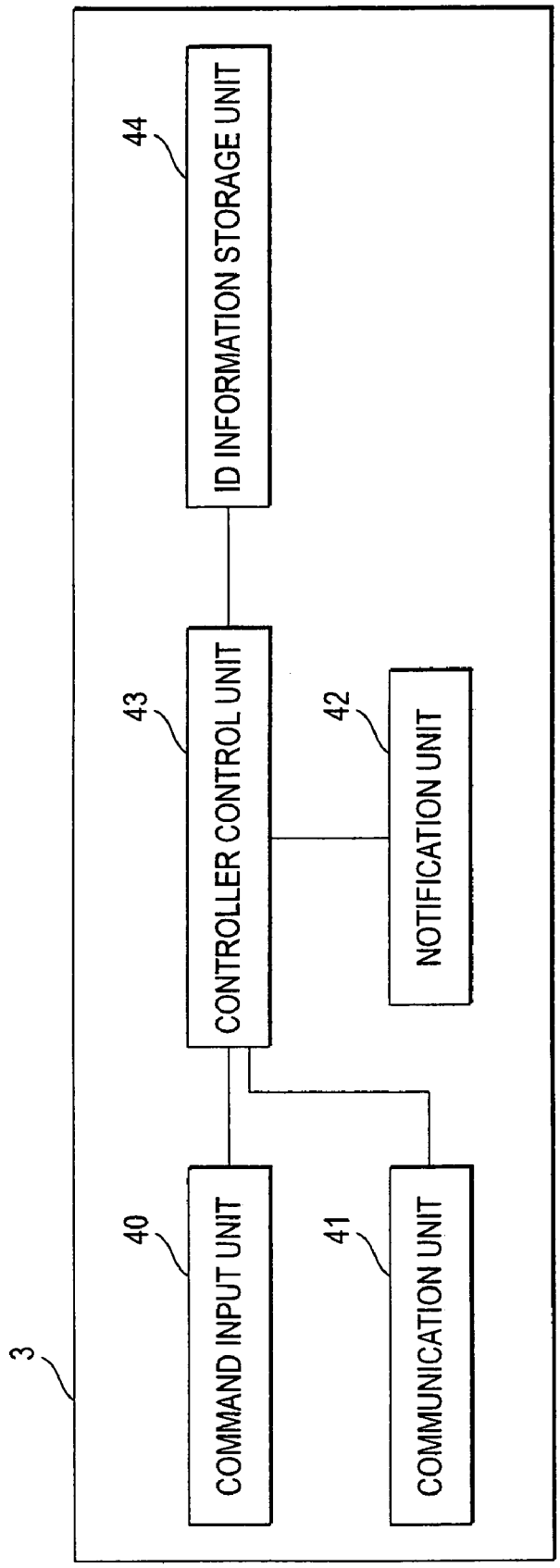
[FIG. 6]

The structure of the security controllers 3 is now described with reference to FIG. 6. FIG. 6 is a block diagram showing an example of the general structure of the security controllers 3.

Each of the security controllers 3 has a command input unit 40, a communication unit 41, a notification unit 42, a controller control unit 43, and an ID information storage unit 44.

The command input unit 40 is a unit through which the user inputs commands or other operations. The information inputted by the user is transmitted to the controller control unit 43.

The communication unit 41 communicates with other security controllers 3 and the security apparatus 2. The communication unit 41 transmits control commands and the like to other security controllers 3 and the security apparatus 2. The security controllers 3 having received PING commands from the security apparatus 2 transmit these commands to the controller control unit 43. Subsequently, the controller control unit 43 decodes the commands and command the communication unit 41 to send radio waves to the security apparatus 2. Then, the communication unit 41 transmits radio waves to the security apparatus 2 based on the commands.

The notification unit 42 notifies the user of the contents of the commands given from the security apparatus 2 or other security controllers 3. The notification unit 42 may be constituted by a display device such as a liquid crystal display or an audio microphone, for example.

The controller control unit 43 provides various controls over the command input unit 40, the communication unit 41, and the notification unit 42.

The ID information storage unit 44 stores information used for specifying other security controllers 3 and the security apparatus 2, which information includes respective ID information on the corresponding security controller 3, the other security controllers 3, and the security apparatus 2.

In the function block of each security controller 3, the command input unit 40, the communication unit 41, and the notification unit 42 are connected with the CPU, ROM, and RAM through buses. The functions of these components may be provided by the CPU which reads the programs stored in the ROM and transfers the programs to the RAM to execute the programs, or by an IC which performs the respective functions.

(Security Waiting Process)

Figure 7:
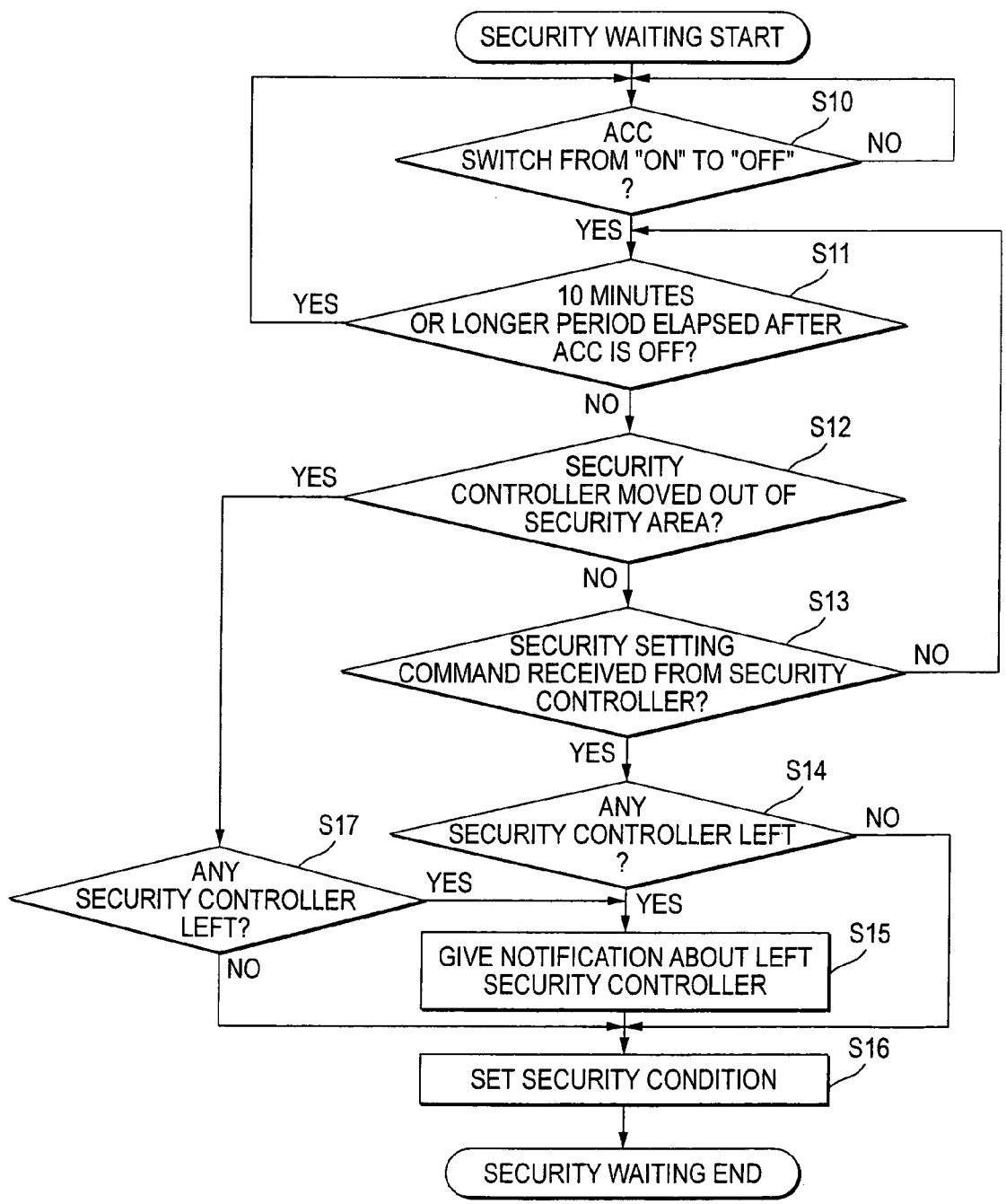
[FIG. 7]

Next, an example of the process for shifting the non-security condition (non-security mode) of the security apparatus 2 in this embodiment to the security condition (security mode), i.e., the security waiting process is explained. FIG. 7 is a flowchart showing an example of the security waiting process performed by the security apparatus 2 in this embodiment.

Initially, the security apparatus 2 determines whether the ACC power source of the car has been switched from "ON" to "OFF" (step S10, the step numbers are abbreviated as S10 hereinafter). In the security apparatus 2, the ACC determining section 21 monitors the switchover of the ACC power source from "ON" to "OFF", and the non-security mode continues unless the ACC power source is switched to "OFF" ("NO" in S10).

When "YES" in step S10, i.e., when the user rotates the key of the car engine to turn off the power source and thus switches the ACC power source from "ON" to "OFF", the security apparatus 2 determines whether the period of 10 minutes or longer has elapsed from the "OFF" condition of the ACC power source (S11).

According to the security apparatus 2 in this embodiment, the non-security mode continues if the requirements for shifting to the security mode are not satisfied within 10 minutes.

When it is determined that the period of 10 minutes or longer has not elapsed by completion of these steps ("NO" in step S11), the security apparatus 2 determines whether any of the security controllers 3a through 3c has moved out of the security area 50 (S12). In the security apparatus 2, the distance determining section 22 records the intensities of the radio waves received from the security controllers 3a through 3c in the security controller monitoring table 30. Then, the distance determining section 22 compares the reference radio wave intensities stored in advance and the intensities of the radio waves currently received from the security controllers 3a through 3c, and judges by checking whether the current radio wave intensities are larger or smaller than the reference radio wave intensities.

More specifically, the respective intensities of the radio waves currently received from the security controllers 3 are compared with the records of the intensities of the radio waves from the security controllers 3 recorded in the security controller monitoring table 30. When any of the respective radio wave intensities which have been larger than the reference radio wave intensities is decreased to be smaller than the reference radio wave intensities, it is determined that the corresponding security controller 3 has moved out of the security area 50.

When the security controllers 3 do not move out of the security area 50 within the period for performing the processes in steps S10 through S12 ("NO" in S12), the manual change determining section 20 determines whether the command for changing the setting to the security mode has been transmitted from any of the security controllers 3a through 3c (S13).

When any of the security controllers 3 is located out of the security area 50 ("YES" in S12), the left-controller determining section 26 judges whether any of the security controllers 3 has been left inside the car (S17).

Generally, the period for performing the processes from step S10 to step S12 is extremely short. Since the initial determination is made by the security apparatus 2 in step S12 immediately after the ACC power source is brought into "OFF" condition, it is highly probable that all of the security controllers 3a through 3c are positioned within the security area 50. Thus, the flow generally goes to the next step S13 after the initial judgment made by the security apparatus 2 in step S12.

In step S13, the security apparatus 2 determines whether the command for changing the setting to the security mode has been transmitted from any of the security controllers 3a through 3c based on the requirement of the user.

Then, when the manual change determining section 20 of the security apparatus 2 determines that the command for changing the setting to the security mode has not been transmitted from any of the security controllers 3a through 3c ("NO" in step S13), the flow returns to step S11. When "YES" in step S13, it is judged whether any of the security controllers 3 has been left behind (S14).

Thus, the processes from step S11 to step S13 are repeated in the security apparatus 2 until the command for changing the setting to the security mode is directly transmitted from the user or until any of the security controllers 3 moves out of the security area 50. When the period of 10 minutes or longer elapses from the "OFF" condition of the ACC power source in the judgment processes from step S11 to step S13, the security condition is not established ("YES" in S11).

When it is determined that the security apparatus 2 has received the command for changing the setting to the security mode from any of the security controllers 3a through 3c in step S13, it is judged whether any of the security controllers 3a through 3c has been left inside the car (S14). When the security apparatus 2 determines that any of the security controllers 3a through 3c has been left inside the car ("YES" in S14), the security apparatus 2 notifies the user that the security controller 3 has been left behind (S15). More specifically, when the left-controller determining section 26 of the security apparatus 2 determines that any of the security controllers 3a through 3c has been left inside the car, the left-controller determining section 26 gives information about the fact that the security controller 3 has been left behind to the security controllers 3 other than the left security controller based on the judgment through the communication unit 4. Thus, the left-controller determining section 26 functions as notification means.

When the security apparatus 2 determines that no security controller 3 has been left behind ("NO" in S14), the setting is switched to the security mode (S16).

When it is determined that any of the security controllers 3 has been left inside the car in step S17 after the judgment that any of the security controllers 3 has moved out of the security area 50 in step S17, the flow goes to step S15 and notifies the other security controllers 3 of the fact that the security controller 3 has been left behind. Then, the security apparatus 2 changes the setting to the security mode (S16).

When none of the security controllers 3 is left inside the car, the flow goes to step S16. The processes performed after this step are similar to those having been described above and therefore the explanation of those is not repeated herein.

The method of the judgment whether the security controllers 3 have been left behind in the security apparatus 2, and the method of the notification given to the user in the case where any of the security controllers 3 has been left behind will be explained in detail later.

Figure 8:
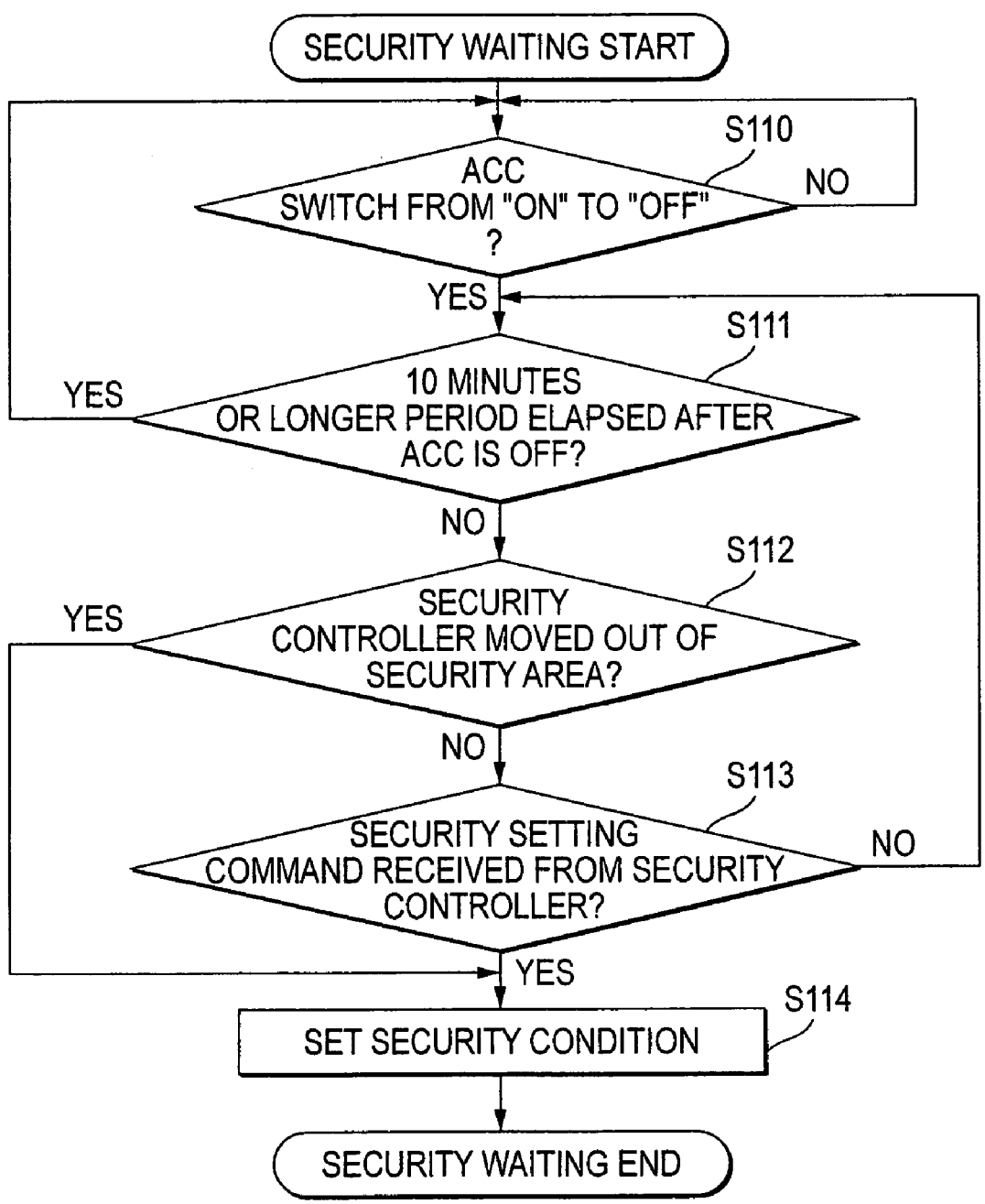
[FIG. 8]

After describing the example of the process flow performed by the security apparatus 2 according to this embodiment, a comparison example of the security waiting process performed by a structure which does not include a function of determining whether any of the security controllers 3 has been left behind is now discussed with reference to FIG. 8. FIG. 8 is a flowchart showing an example of a security waiting process conducted by a comparison example shown in comparison with the security apparatus 2 in this embodiment.

Since the processes from step S110 to step S113 in the process flow of the comparison example are similar to those from step S10 to step S13 in the process flow shown above, the same explanation is not repeated herein.

According to this comparison example, when it is determined that any of the security controllers 3 has moved out of the security area 50 in step S112, or when the command for changing the setting to the security mode is transmitted from any of the security controllers 3 in step S113, the security apparatus 2 changes the setting to the security mode. Thus, the process flow in this comparison example is different from the flow of the security apparatus 2 in this embodiment in these two points.

In this embodiment, the security apparatus 2 judges whether any of the security controllers 3 has been left behind in the step immediately before the setting is changed to the security mode, and gives notification when any of the security controllers 3 has been left behind.

Thus, when any of the security controllers 3 has been left inside the car, the user can be notified of the fact that the security controller 3 has been left behind. After giving this notification, the security apparatus 2 sets the security condition for the car 51 as the security target.

More specifically, the security apparatus 2 can call the user's attention to the fact that the security controller 3 has been left behind before switching the setting of the car to the security mode when the security controller 3 has been left inside the car.

Moreover, the security apparatus 2 prevents continuation of the non-security condition caused by erroneous recognition that the user is still in the car since the security controller 3 has been left inside the car. Thus, a person other than the user cannot approach and do harm since continuation of the non-security condition is prevented even when any of the security controllers 3a through 3c is left behind.

According to the comparison example, the security mode is set when the command for setting the security mode is received from any of the security controllers 3 or when any of the security controllers 3 moves out of the security area 50.

Thus, in this comparison example, a person other than the user cannot approach and do harm since continuation of the non-security condition is prevented even when any of the security controllers 3a through 3c is left behind similarly to the case of the security apparatus 2 in this embodiment.

However, after the security mode is set, there is a possibility that the security mode is cancelled only when a person other than the user approaches the car without notice of the user since any of the security controllers 3 has been left near the security apparatus 2.

(Security Process and Security Canceling Process)

Figure 9:
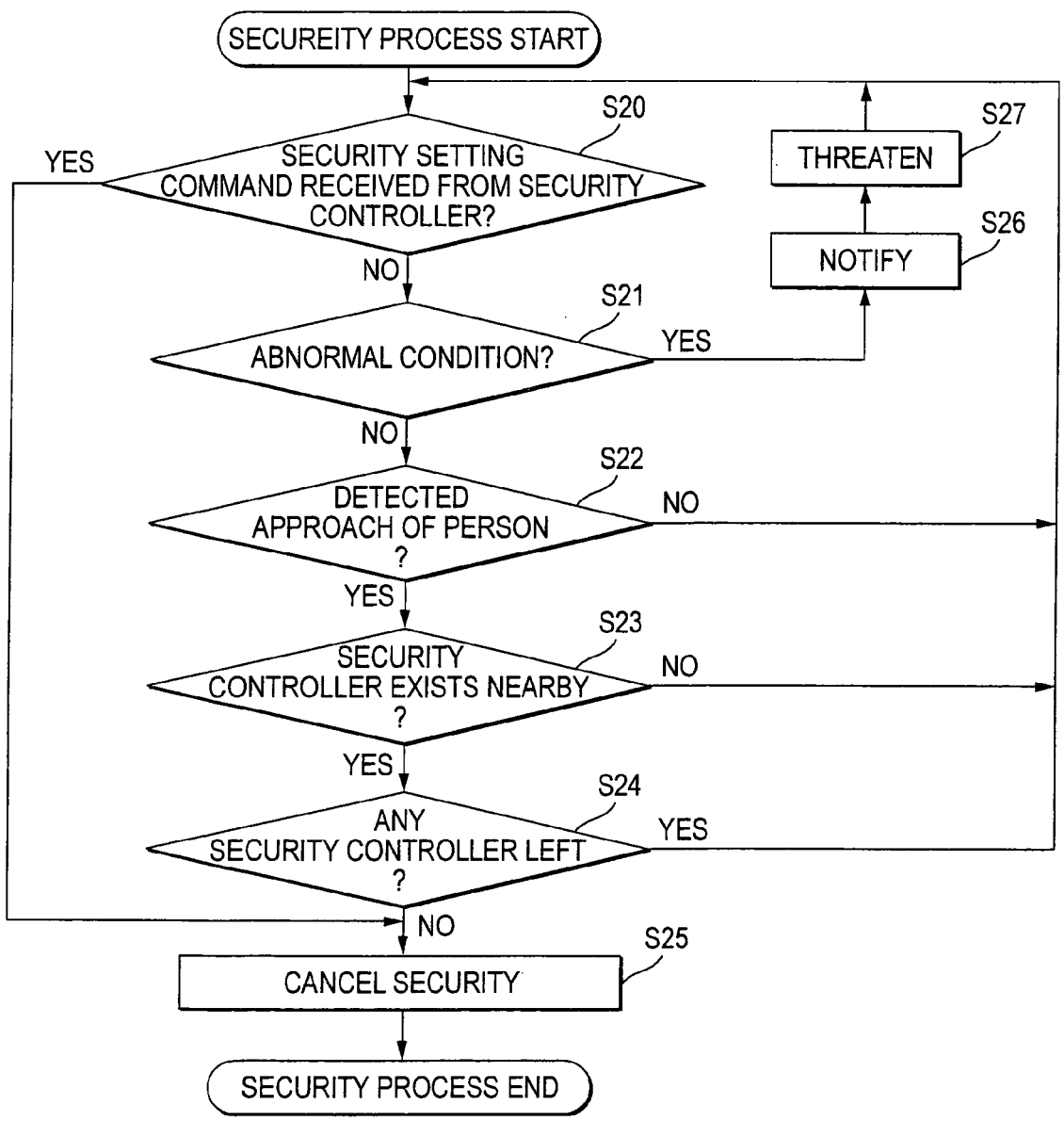
[FIG. 9]

Next, the security process performed from the condition where the security mode has been set to the step for canceling the security condition is described with reference to FIG. 9. FIG. 9 is a flowchart showing an example of the security process and the security canceling process conducted by the security apparatus 2 in this embodiment.

It is initially assumed that this process starts under the condition where the security mode has been set for the car as the security target.

The manual change determining section 20 of the security apparatus 2 determines whether a command for canceling the security mode has been transmitted from any of the security controllers 3a through 3c under the condition where the security mode has been set (S20).

When it is determined that the command for canceling the security mode has not been received from any of the security controllers 3a through 3c ("NO" in S20), the abnormal condition determining section 24 of the security apparatus 2 determines whether the car as the security target is in the abnormal condition (S21)

When it is determined that the command for canceling the security mode has been received from any of the security controllers 3a through 3c ("YES" in S20), the security mode changing section 25 of the security apparatus 2 cancels the security mode having been set so as to change the setting to the non-security mode.

More specifically, the security mode changing section 25 receives the command for canceling the security mode from any of the security controllers 3 through the communication unit 4. Then, the security mode changing section 25 commands the threatening unit 5 to cancel the security mode, and rewrites the security mode of the mode setting information 31 to the non-security mode in response to the received command.

Thus, according to the security apparatus 2 in this embodiment, the security condition can be promptly canceled based on the command for canceling the security mode given from any of the security controllers 3 carried by the user.

When it is determined that the car as the security target is not in the abnormal condition in step S21 ("NO" in S21), the security apparatus 2 judges whether a person is approaching (S22).

When it is determined that the car as the security apparatus 2 is in the abnormal condition in step S21 ("YES" in S21), the security apparatus 2 notifies the security controllers 3a through 3c of the fact that the abnormal condition has been caused (S26), and gives a threat (S27). After continuation of threatening for a certain period, the condition returns to the security condition.

More specifically, when the abnormal condition determining section 24 determines that the car as the security target is in the abnormal condition using the abnormal condition detecting unit 8, the abnormal condition determining section 24 gives notification about the occurrence of the abnormal condition to the security controllers 3a through 3c through the communication unit 4 and commands the threatening unit 5 to perform threatening operation. Since the threatening unit 5 has been brought to the security mode by the security mode changing unit 25, the threatening unit 5 having received the requirement for the threatening operation from the abnormal condition determining section 24 generates alarm sound or emits light.

When the security apparatus 2 detects approach by a person in step S22 ("YES" in S22), it is judged whether any of the security controllers 3a through 3c is positioned near the security apparatus 2 (S23).

When the security apparatus 2 does not detect any approach by a person ("NO" in S22), the flow returns to step S20. Thus, the detections conducted from S20 to S22 are repeated.

When the security apparatus 2 determines that any of the security controllers 3a through 3c is positioned near the security apparatus 2 in step S23 ("YES" in S23), that is, when the security apparatus 2 determines that any of the security controllers 3a through 3c is located within the security area 50, it is judged whether any of the security controllers 3a through 3c has been left behind (S24).

When it is determined that none of the security controllers 3a through 3c is positioned near the security apparatus 2 ("NO" in S23), the flow returns to step S20.

More specifically, while detecting approach by a person ("YES" in S22) and determining that none of the security controllers 3a through 3c is located within the security area 50 ("NO" in S23), the security apparatus 2 repeatedly judges whether the command for canceling the security mode is given from any of the security controllers 3 (S20) and whether the car as the security target is in the abnormal condition (S21).

When the security apparatus 2 determines that any of the security controllers 3a through 3c is positioned near the security apparatus 2, that is, within the security area 50 in step S23 ("YES" in S23), it is judged whether any of the security controllers 3a through 3c has been left behind (S24).

When it is determined that any of the security controllers 3 has been left behind ("YES" in S24), the processes from step S20 are again repeated.

When it is determined that none of the security controllers 3 has been left behind ("NO" in S24), the security condition is canceled (S25).

More specifically, when it is determined that any of the security controllers 3 has been left behind, the security apparatus 2 does not cancel the security mode for the combined reasons that the security controller 3 has been left behind and that a person other than the proper user is approaching. According to the security apparatus 2, therefore, the proper user needs to cancel the security mode by transmitting the command which requires the security apparatus 2 to cancel of the security mode using the security controllers 3.

Accordingly, in the security apparatus 2 in this embodiment, the security mode is not erroneously canceled for the combined reasons that the security controller 3 has been left behind and that a person other than the proper user is approaching even in such a case where any of the security controllers 3 has been left behind.

Figure 10:
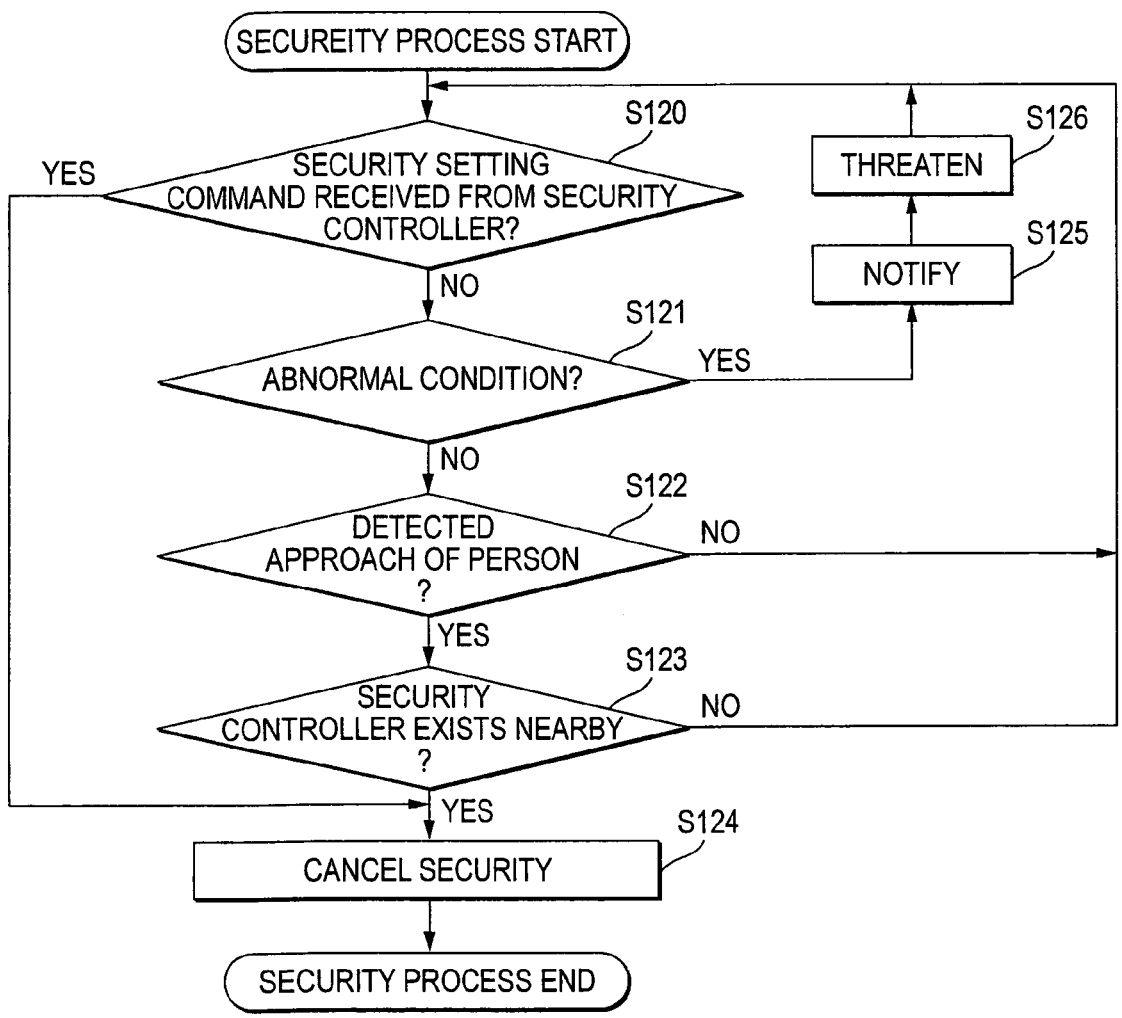
[FIG. 10]

After explaining the example of the security process and the security canceling process performed by the security apparatus 2 in this embodiment, a process flow conducted by a structure not including the function of judging whether any of the security controllers 3 has been left behind is discussed as a comparison example with reference to FIG. 10. FIG. 10 is a flowchart showing examples of the security process and the security canceling process in comparison with the case of the security apparatus 2 in this embodiment.

The processes from steps S120 to S123 and from steps S124 to S126 in this comparison example are similar to those from steps S20 to S23 and from steps S25 to S27 in the above process flow, and thus explanation of those are not repeated herein.

This comparison example is different from the process flow performed by the security apparatus 2 in this embodiment in that the security apparatus 2 cancels the security condition (S124) when any of the security controllers 3a through 3c is located within the security area 50 in step S123.

Thus, in this comparison example, the security mode is erroneously canceled by approach of a person other than the proper user toward the car as the security target when any of the security controllers 3 having been left behind is located inside the car.

However, the security apparatus 2 in this embodiment does not cancel the security mode for the combined reasons that the security controller 3 has been left behind and that a person other than the proper user is approaching. Thus, the security apparatus 2 is more preferable than the structure of the comparison example.

(Left-controller Judging Process)

The details of the left-controller judging process are now described.

When the requirements for setting the security mode are all satisfied or when the command for setting the security mode. is received from any of the security controllers 3a through 3c, the security apparatus 2 in this embodiment notifies the security controllers 3 positioned within the security area 50 of the switching to the security mode.

This notification may be provided by the notification unit 42 of each security controller 3 which displays the contents of the notification or by the notification unit 42 which informs the user of the contents of the notification using voices. Alternatively, the notification unit 42 of the security controller 3 may have a vibration function and notify through the vibration. Any of the functions of display, voice, and vibration may be combined for the notification to the user.

When the security controllers 3 carried by the proper users receive the notification, the security controllers 3 return response to the notification. However, in case of the security controller 3 having been left behind, this security controller 3 gives no response to the notification.

Thus, the security apparatus 2 determines that the security controller 3 which does not respond to the notification is the left security controller 3.

More specifically, when receiving the information from the ACC determining section 21 and the distance determining section 22, the security mode change determining section 27 initially determines whether the setting needs to be changed to the security mode. When it is determined that the setting change is necessary, the security mode change determining section 27 commands the left-controller determining section 26 to change the setting to the security mode.

More specifically, when the security mode change determining section 27 receives information that the ACC power source has been switched from "ON" to "OFF" from the ACC determining section 21 and information that any of the security controllers 3a through 3c has moved from inside of the security area 50 to the outside from the distance determining section 22, the security mode change determining section 27 transmits information on the command for changing the setting to the security mode to the left-controller determining section 26.

The left-controller determining section 26 having received the information from the security mode change determining section 27 refers to the security controller monitoring table 30 and specifies the security controllers 3 positioned within the security area 50.

Then, the left-controller determining section 26 transmits command requiring response (response requiring command) to the specified security controllers 3 through the communication unit 4. The left-controller determining section 26 waits for a predetermined time (such as 5 minutes) and judges that the security controller 3 to which the response requiring command has been transmitted but from which no respond has been returned is the left security controller 3.

The response requiring commands are transmitted to all the security controllers 3. The left-controller determining section 26 may determine that the security controller 3 positioned within the security area 50 is the left security controller 3 at the time when the command for changing the setting to the security mode is received from any of the security controllers 3a through 3c as the response to the response requiring command.

Alternatively, the left-controller determining section 26 may determine that the security controller 3 which is positioned within the security area 50 and other than the security controller 3 having responded to the response requiring command first is the left security controller 3. In this case, since the security apparatus 2 allows only one security controller 3 positioned within the security area 50 to have the auto-security function, the auto-security function can be securely limited to only the security controller 3 carried by the user.

In this structure, therefore, the security controllers 3 including the left security controller 3 which are positioned within the security area 50 and are other than the specific security controller 3 do not have the auto-security function. As a result, the possibility that the security mode is erroneously canceled can be decreased.

As obvious from above, the security apparatus 2 in this embodiment transmits the response requiring command to the security controllers 3 positioned within the security area 50. Then, the security apparatus 2 judges whether the security controllers 3 within the security area 50 have been left behind or not based on their response conditions to the response requiring command.

Thus, when the proper user is washing the car or on other occasions and the security controller 3 is located within the security area 50, the erroneous setting to the security mode can be prevented by giving notification that setting the security mode is inhibited as the response to the response requiring command.

According to the security apparatus 2 in this embodiment, the left-controller determining process for determining the security controller 3 having been left behind may be performed by the following method.

In this structure, when the command for setting the security mode is received from any of the security controllers 3a through 3c and any of the security controllers 3a through 3c remains within the security area 50 after elapse of a predetermined time (such as 5 minutes), the security controller 3 positioned within the security area 50 may be determined as the left security controller 3.

Alternatively, when the security mode change determining section 27 judges that the requirements for setting the security mode are satisfied as described above and any of the security controllers 3a through 3c remains within the security area 50 after elapse of a predetermined time (such as 5 minutes), the security controller 3 positioned within the security area 50 may be determined as the left security controller 3.

When any of the security controllers 3 remains within the security area 50 after elapse of time which is a relatively long period such as 30 minutes, security controller 3 positioned within the security area 50 may be determined as the left security controller 3. In this case, it is possible to determine whether the security controllers 3 have been left behind or not after accurately observing the conditions of the security controllers 3 located within the security area 50.

More specifically, when the security mode change determining section 27 determines that the setting needs to be changed to the security mode based on the command for setting the security mode received from any of the security controllers 3a through 3c via the communication unit 4 or based on the information transmitted from the ACC determining section 21 and the distance determining section 22, the security mode change determining section 27 transmits the command for changing the setting to the security mode to the left-controller determining section 26.

The left-controller determining section 26 having received the command from the security mode change determining section 27 refers to the security controller monitoring table 30 after elapse of a predetermined time and specifies the security controller 3 positioned within the security area 50 as the security controller 3 having been left behind.

Alternatively, when the security mode change determining section 27 determines that the requirements for setting the security mode are satisfied, the security mode change determining section 27 may judge that the security controller 3 positioned within the security area 50 is the left security controller 3.

In these cases, the left-controller determining section 26 determines whether the security controllers 3 have been left behind by only referring to the information included in the security controller monitoring table 30. Thus, the determination whether the security controllers 3 have been left behind can be made by a simpler structure than the above structure which requires response from the security controllers 3 positioned within the security area 50.

However, when any of the plural users stays inside the car and carries the security controller 3, this security controller 3 is recognized as the security controller 3 having been left behind. Thus, the structure of the security apparatus 2 in this embodiment is more preferable in view of accuracy for judging whether the security controllers 3 have been left behind.

For enhancing the accuracy of the left-controller judgment by the left-controller determining section 26, the security controllers 3 and the security apparatus 2 may have the following structure as well as the above structure.

In this structure, the security controllers 3 may further include an accelerator sensor or a vibration sensor (not shown), for example, so as to transmit vibration or the like generated by the security controller 3 to the security apparatus 2 while the security controllers 3 are being carried by the user.

On the other hand, the security apparatus 2 may include a vibration detection unit (not shown) for detecting mobility information such as vibration transmitted from the security controller 3, and a vibration determining unit (not shown) for determining whether the security controller 3 is moving or not based on the detection result obtained from the vibration detection unit.

In this case, the security apparatus 2 can detect vibration generated from the security controller 3 which is being carried by the user. Thus, the left-controller determining section 26 further adds the information whether the security controller 3 is being carried by the user to the above left-controller determining process. As a result, the security apparatus 2 can determine whether the security controller 3 positioned within the security area 50 has been left behind or not with higher accuracy.

The security apparatus 2 may further include a Doppler sensor (not shown) to detect the actions of the persons staying inside the car having a similar function as that of the approaching object detecting unit 7, and a Doppler sensor analyzing unit (not shown) for analyzing the information given from the Doppler sensor in the security processing unit 10.

The security apparatus 2 may further include a pressure sensor (not shown) for detecting a predetermined pressure or larger which is positioned below the seat of the car to detect the weight of the person sitting on the seat, and a pressure sensor analyzing unit (not shown) for analyzing the information given from the pressure sensor in the security processing unit 10. In these cases, the Doppler sensor analyzing unit and/or the pressure sensor analyzing unit may judge whether the user is staying inside the car based on the detection information given from the Doppler sensor and/or the pressure sensor. Then, the left-controller determining section 26 may further use the judgment result made by the Doppler sensor analyzing unit and/or the pressure sensor analyzing unit as the information on which the left-controller determination process is based. In this case, the information about the presence or absence of the user inside the car is added to the left-controller determining process.

Accordingly, the left-controller determining section 26 can determine whether the security controllers 3 positioned within the security area 50 have been left behind with higher accuracy.

The security apparatus 2 in this embodiment determines whether the security controllers 3 positioned within the security area 50 have been left behind not only by monitoring the security controllers 3, but also by the notification given from the user who has noticed that any of the security controllers 3 has been left behind.

More specifically, when the security apparatus 2 receives the information showing any of the security controllers 3a through 3c has been left inside the car from any of the security controllers 3a through 3c located out of the security area 50, the security apparatus 2 determines that the security controller 3 positioned inside the security area 50 and specified according to this information is the left security controller 3.

This notification given from the outside of the security area 50 includes the ID information such as the ID of the left security controller 3. Thus, the security apparatus 2 can specify which of the security controllers 3 positioned within the security area 50 has been left behind based on the information.

When any of the security controllers 3a through 3c is located within the security area 50 under the condition where the command for setting the security mode has been given in advance, the security apparatus 2 may recognize the security controller 3 positioned within the security area 50 as the security controller 3 having been left behind if the requirements for setting the security mode are satisfied.

(Notification after Left-controller Determination)

As explained in "Security Process and Security Canceling Process", when the security apparatus 2 determines that any of the security controllers 3 has been left inside the car, the security apparatus 2 notifies the user of the fact that the security controller 3 has been left behind. The process of this notification is now discussed.

When the security apparatus 2 determines that any of the security controllers 3 has been left behind at the time of setting the security mode for the car 51 as the security target, the security apparatus 2 informs the security controllers 3a through 3c of the fact that any of the security controllers 3a through 3c has been left inside the security area 50.

At this stage, it is more preferable to transmit information for requiring the security controllers 3 other than the notified security controller 3 to display their conditions. In this case, since the information about whether the security controllers 3 other than the notified security controller 3 are located within the security area 50 or not is displayed, the information on which of the security controllers 3 has been left behind and which of the security controllers 3 has been still carried by the user within the security area 50 can be clarified.

According to the security apparatus 2 in this embodiment, the left-controller determining section 26 transmits information on the command for changing the setting to the security mode to the security mode changing section 25 and stores information (not shown) on the security controller 3 specified as the left security controller 3 in the storage unit 11 after the above notification is given to the security controllers 3a through 3c.

Then, the security mode changing section 25 commands the threatening unit 5 to set the security mode based on the information received from the left-controller determining section 26.

In this way, the security apparatus 2 sets the security mode for the car 51 as the security target after determining whether any of the security controllers 3 has been left behind.

When the user carrying the security controller 3 comes back to the car 51 as the security target after the security mode is set for the car 51 as the security target, the security apparatus 2 cancels the security mode using the security controller 3 carried by the user. Thus, the security apparatus 2 does not cancel the security mode until the user suspends the auto-security function and cancels the security mode manually.

In another example, when the security apparatus 2 determines that any of the security controllers 3 has been left behind, the security apparatus 2 does not suspend the auto-security function in the manner as described above but commands the left security controller 3 to turn off the power. This structure similarly prevents erroneous canceling of the security mode.

As obvious from above, according to the security apparatus 2 in this embodiment, the left-controller determining section 26 can make judgment whether any of the security controllers 3 has been left inside the security area 50 at the time of setting the security mode. When it is determined that any of the security controllers 3 has been left behind, the security apparatus 2 gives the information that any of the security controllers 3 has been left behind to the security controllers 3a through 3c. Then, the security apparatus 2 switches the setting to the security mode after giving this notification.

Thus, when the security apparatus 2 judges that the left security controllers 3 is located inside the security area 50, the security apparatus 2 gives information about the left security controller 3 to the user. After the user recognizes the left security controller 3, the security apparatus 2 switches the setting of the car 51 as the security target to the security mode. Accordingly, the security apparatus 2 prevents continuation of the non-security mode for the car 51 as the security target.

It is therefore possible to avoid continuation of the non-security condition of the car 51 as the security target and prevent harms given by a person other than the proper user when any of the security controllers 3 is left behind.

Moreover, the security apparatus 2 suspends the auto-security function and prevents canceling of the security mode when any of the security controllers 3 is left behind. Thus, when a person who does not carry the security controller 3 approaches the car 51 as the security target, the security apparatus 2 does not automatically cancel the security mode for the combined reasons that the security controller 3 has been left behind and that the person is approaching.

(Notification to Security Controller Positioned within Security Area)

As discussed above, when any of the security controllers 3 is left behind, the security apparatus 2 informs the other security controllers 3 of the existence of "the left security controller 3". Thus, the security apparatus 2 gives notification to the user about the left security controller 3.

Next, the security apparatus 2 which gives additional appropriate notification in accordance with the behaviors of the users carrying the security controllers 3a through 3c is explained.

As described above, the plural security controllers 3a through 3c are registered in the security apparatus 2 in this embodiment. It is therefore necessary for the users to recognize the timing for setting the security mode in accordance with the relative positions of the security controllers 3a through 3c.

As obvious from above, the security apparatus 2 sets the security mode for the car 51 as the security target by the auto-security function when any of the security controllers 3a through 3c moves from the inside of the security area to the outside.

However, there is a possibility that the timing of getting out of the car 51 and moving away by one user is different from that timing by other users, and it is thus required to determine which of the security controllers 3 as the reference security controller for setting the security mode which is set when the reference controller moves out of the security area 50.

According to the security apparatus 2 in this embodiment, the requirement for giving a command for changing the setting to the security mode is that any of the security controllers 3 moves out of the security area 50 before elapse of a predetermined period, i.e., within 10 minutes, from the time when the ACC power source is "OFF". In more accurate words, the requirement for giving the command for changing the setting to the security mode is that any one of the security controllers 3a through 3c moves out of the security area 50 within 10 minutes.

Thus, no problem occurs when all the users carrying the security controllers 3a through 3c get off the car 51 as the security target and move out of the security area 50 almost at the same time. Also, no problem occurs when each user moves out of the security area 50 with different timing but within 10 minutes of the period during which whether the security condition is set or not is determined from the time when the ACC power source is switched from "ON" to "OFF".

More specifically, the security controller 3 carried by the first user who moves out of the security area 50 first gives a command for temporarily setting the security mode. Since the second user is staying inside the security area 50, the security controller 3 carried by the second user gives a command for canceling the security mode. However, when the second user moves out of the security area 50, the command for setting the security mode is again given.

As a result, the security apparatus 2 gives the command for setting the security mode at the time when the last user moves out of the security area 50.

However, when not all of the users carrying the security controllers 3 move out of the security area 50 before elapse of 10 minutes from the time when the ACC power source is switched from "ON" to "OFF", the setting remains in the non-security condition.

As explained in above "Security Waiting Process" with reference to FIG. 7, the security apparatus 2 in this embodiment waits for the predetermined period (5 minutes) after the time when the security controllers 3 move out of the security area 50, and judges whether any of the security controllers 3a through 3c has been left behind. When the security apparatus 2 determines that none of the security controllers 3 has been left behind, the security apparatus 2 gives a command for changing the setting to the security mode.

Thus, after movement of the plural users carrying the security controllers 3 out of the security area 50 within 10 minutes and elapse of 5 minutes from the time when the last user moves out of the security area 50, the security apparatus 2 judges whether any of the security controllers 3 has been left behind.

Accordingly, even when another user still remains within the security area 50, the security apparatus 2 can give the command for changing the setting to the security mode since the security controller 3 carried by this user is not the left security controller 3. However, the security apparatus 2 gives a notification that the security condition is to be set at least to the security controller 3 positioned within the security area 50 at the time of determining whether any of the security controllers 3 has been left behind. This notification prevents unintended threats and the like given by the change to the security mode for the car 51 as the security target which is made while the user remaining within the security area 50 is not noticing it.

This notification may be given not only to the security controller 3 positioned within the security area 50 but also to all the security controllers 3. In this case, since other security controllers 3 receive this notification, other users can recognize that the security condition has been set for the car 51 as the security target.

The notification that the security mode has been set is given to the security controllers 3 by the left-controller determining section 26 through the communication unit 4 under the control of the left-controller determining section 26. Thus, the left-controller determining section 26 functions as security condition notification means.

When the security apparatus 2 in this embodiment determines that any of the security controllers 3 has been left in the car 51 as the security target, the security apparatus 2 sets the security mode for the car 51 as the security target after giving notification based on the judgment result to other security controllers 3. In another example, however, the security apparatus 2 does not set the security mode after giving this notification.

More specifically, the security apparatus 2 is so structured as not to change the setting to the security mode after notifying the security controllers 3a through 3c of the fact that any of the security controllers 3a through 3c has been left in the car 51 as the security target. In this case, the security apparatus 2 gives additional notification that the setting is not changed to the security mode to the security controllers 3a through 3c.

The security apparatus 2 thus requires the user to deal with the two notifications that any of the security controllers 3a through 3c has been left within the security area 50 and that the setting is not changed to the security mode. When the user who left the security controller 3 behind returns to the car 51 as the security target, he or she is not threatened unexpectedly since the security mode is not set.

In still another example, when it is determined that any of the security controllers 3 has been positioned within the security area 50, the security apparatus 2 does not set the security mode after giving notification based on the judgment result to other security controllers 3.

More specifically, the security apparatus 2 is so structured as not to change the setting to the security mode after notifying the security controllers 3a through 3c of the fact that any of the security controllers 3a through 3c has been positioned within the security area 50. In this case, the security apparatus 2 gives additional notification that the setting is not changed to the security mode to the security controllers 3a through 3c. It is preferable to give information about the security controller 3 located within the security area 50. In this case, the user can check the security controller 3 positioned within the security area 50 by referring to this information, and can give a command for setting or not setting the security mode to the security apparatus 2 after checking this security controller 3.

The security apparatus 2 thus requires the user to deal with the two notifications that any of the security controllers 3a through 3c has been positioned within the security area 50 and that the setting is not changed to the security mode. When the user who left the security controller 3 behind returns to the car 51 as the security target, he or she is not threatened unexpectedly since the security mode is not set. It is also possible to prevent unintended threats and the like given by the change to the security mode for the car 51 as the security target which is made while the user is not noticing it.

In still another example, when it is determined that any of the security controllers 3 has been positioned within the security area 50 and the user gives a command for changing the setting to the security mode, the security apparatus 2 does not set the security mode.

In this case, the security apparatus 2 gives additional notification that the setting is not changed to the security mode to the security controllers 3a through 3c. When the user gives a command for changing the setting to the security mode again based on this notification, the setting is changed to the security mode.

Thus, the security apparatus 2 can notify the user of the fact that any of the security controllers 3 is located within the security area 50 by inhibiting the setting to the security mode which has been required according to the command from the security controllers 3. More specifically, the security apparatus 2 operates in a manner different from the ordinary operation required using the security controllers 3. As a result, the user can recognize the security controller 3 having been positioned within the security area 50.

When all the plural users for the car 51 as the security target stay at the same place, the security controller 3 having been located within the security area 50 is the security controller having been left by any of the plural users.

Concerning the judgment whether any of the security controllers 3 has been left behind in the setting canceling process, in the case where the security mode has been set by other security controllers 3, all the security controllers 3 having been located within the security area 50 for a period of 30 minutes or longer, for example, may be recognized as the security controllers 3 having been left behind.

In this case, since all the security controllers 3 remaining within the security area 50 for a long time are determined as the left security controllers 3, the security controller 3 carried by the user staying within the car is recognized as the left security controller.

Thus, when the security mode is set for the car 51 as the security target and the user is taking a nap with the security controller 3 inside the car, this security controller 3 is recognized as the security controller having been left behind. Accordingly, erroneous canceling of the security mode for the combined reasons that the security controller 3 of this user exists and a person other than the proper user is approaching the car 51 as the security target can be prevented.

According to the security system 1 in this embodiment, all the security controllers 3a through 3c have the auto-security function. However, the auto-security function may be limited to any one of the plural security controllers 3a through 3c.

In this case, the auto-security function is limited to any one of the security controllers 3a through 3c while all the security controllers 3a through 3c are registered in the security apparatus 2. Thus, the problems which may be caused by the left security controllers 3 can be reduced. More specifically, the possibility of automatic canceling of the security mode having been set for the combined reasons that the security controller 3 has been left behind and a person other than the proper user is approaching can be lowered.

The security controller 3 having the auto-security function may be limited to the security controller 3 designated as an auto master remote-controller at the time of shipment from the plant. Alternatively, the user may designate any of the security controllers 3a through 3c as the security controller 3 having the auto-security function.

In this case, the latter method has a higher degree of setting freedom than the former method, since the security controller 3 having the auto-security function can be freely selected.

The security controller 3 having the auto-security function may give a command for disabling the auto-security function to the other security controllers 3 through communication.

The security apparatus 2 may give inquiry about which of the security controllers 3 has the auto-security function to each of the security controllers 3*a* through 3*c*, and determine only the security controller 3 having responded to the inquiry as the security controller having the auto-security function.

The security controller 3 used by the user first or last to give a command for setting the security mode or other operations may be determined as the security controller having the auto-security function.

The security controller 3 having moved away from the car 51 as the security target first or last after stop of the car 51 may be designated as the security controller having the auto-security function.

When any one of the security controllers 3*a* through 3*c* has the auto-security function, it is preferable that the information on which of the security controllers 3 has the auto-security function has been given to the user using the notification unit 42 of each security controller 3.

While the security system 1 in this embodiment includes the three security controllers 3*a* through 3*c*, the number of the security controllers is not limited to three but may be arbitrarily determined in accordance with the number of the users for the security target.

According to the security system 1, the security mode change determining section 27 of the security apparatus 2 changes the setting to the security mode based on the information whether the security controllers 3 are located within the security area 50 received from the distance determining section 22 and the information showing the movement of a person analyzed by the approaching object analyzing section 23. However, the security apparatus 2 may change the setting to the security mode based on whether the security controllers 3 are positioned within the security area 50.

While the security target is the car 51 in the security system 1 in this embodiment, the security target may be other objects such as a house, a building, an office, and a safety box. However, when the security target is a house, a building, an office, or a safety box, the trigger for switching from the non-security mode to the security mode is not the changeover from "ON" to "OFF" of the ACC power source but pushing a security mode setting button or the like equipped on a door or an exist by the user.

The security controllers 3 may be devices combined with cellular phones or the like. In this case, since the position information offered by the GPS (global positioning system) is usable, the security apparatus 2 can acquire more accurate information on the positions of the security controllers 3.

INDUSTRIAL APPLICABILITY

The security apparatus 2 is capable of giving threads to approach, entrance or other action of a person who does not carry the security controller 3 and giving notification about this fact. Thus, the security apparatus 2 is applicable to monitoring means for an area which is preferably prohibited from being used by a person other than persons having particular authorities.

The invention claimed is:

1. An information processing apparatus for monitoring movement of users each carrying an information transmission/reception device into and out of a predetermined area and for controlling security operations for the predetermined area, characterized by comprising:

a communication unit for communicating with each of the plural information transmission/reception devices;

a position recognition unit for acquiring position information on the respective positions of the plural information transmission/reception devices;

a record storage unit for storing position record information showing a record of the position information for a predetermined period;

position judging means for judging whether each of the information transmission/reception devices is located within the predetermined area based on the position information;

first security command means for commanding setting or canceling of a security condition based on the judgment result given by the position judging means;

second security command means for receiving information on the requirement for setting or canceling of the security condition from the information transmission/reception devices through the communication unit, and for commanding setting or canceling of the security condition; and security condition selecting means for selecting either the command by the first security command means or the command by the second security command means based on the position record information.

2. An information processing apparatus according to claim 1, characterized in that:

personal behavior monitoring means for detecting movement of a person into and out of the predetermined area is further included; and the security condition selecting means selects either of the commands based on the detection result obtained from the personal behavior monitoring means as well as the position record information.

3. An information processing apparatus according to claim 2, characterized in that:

the security condition selecting means selects the command given by the first security command means when it is determined that any of the information transmission/reception devices remains within the predetermined area for a predetermined period and that any other of the information transmission/reception devices moves from the inside of the predetermined area to the outside of the predetermined area based on the position record information; and the security condition selecting means selects the command given by the second security command means when it is determined that any of the information transmission/reception devices remains within the predetermined area for a predetermined period and that any other of the information transmission/reception devices moves from the outside of the predetermined area to the inside of the predetermined area based on the position record information.

4. An information processing apparatus according to claim 2, characterized in that:

the security condition selecting means includes response requiring means for requiring the information transmission/reception devices to give response inputted by the users of the information transmission/reception devices;

when it is determined that any of the information transmission/reception devices remains within the predetermined area for a predetermined period based on the position record information, the response requiring means requires the corresponding information transmission/reception device positioned within the predetermined area to give the input response; and in the case where the input response is not given, (1) the security condition selecting means selects the command given by the first security command means when it is determined that the information transmission/reception devices remains within the predetermined area for the predetermined period and that any other of the information transmission/reception devices moves from the inside of the predetermined area to the outside of the predetermined area, and (2) the security condition selecting means selects the command given by the second security command means when it is determined that the information transmission/reception devices remains within the predetermined area for the predetermined period and that any other of the information transmission/reception devices moves from the outside of the predetermined area to the inside of the predetermined area based on the position record information.

5. An information processing apparatus according to claim 1, characterized by further comprising security condition notifying means for giving the information on the command selected by the security condition selecting means to each of the plural information transmission/reception devices through the communication unit.

6. An information processing apparatus according to claim 2, characterized by further comprising security condition notifying means for giving the information on the command selected by the security condition selecting means to each of the plural information transmission/reception devices through the communication unit.

7. An information processing apparatus according to claim 3, characterized by further comprising security condition notifying means for giving the information on the command selected by the security condition selecting means to each of the plural information transmission/reception devices through the communication unit.

8. An information processing apparatus according to claim 4, characterized by further comprising security condition notifying means for giving the information on the command selected by the security condition selection means to each of the plural information transmission/reception devices through the communication unit.

9. An information processing apparatus for setting or canceling a security condition within a predetermined security area in accordance with positions of information transmission/reception devices carried by users who moves into and out of the predetermined area, characterized by comprising:

position judging means for receiving position information showing the respective positions of the information transmission/reception devices and for judging whether the information transmission/reception devices are located within the predetermined area;

a record storage unit for storing position record information showing records of the position information per a certain period; and security condition selecting means for judging whether the information transmission/reception devices are positioned within the predetermined area for a predetermined period based on the position record information, and for determining that any of the information transmission/reception devices remaining within the predetermined area for the predetermined period is the information transmission/reception device having been left within the predetermined area.

10. An information processing apparatus according to claim 9, characterized in that:

personal behavior monitoring means for detecting movement of a person into and out of the predetermined area is further included; and the security condition selecting means judges whether the information transmission/reception devices are left within the predetermined area based on the detection result obtained from the personal behavior monitoring means as well as the position record information.

11. An information apparatus according to claim 9, characterized by further comprising notifying means for providing the information on the information transmission/reception device determined as the device having been left within the predetermined area by the security condition selecting means to the information transmission/reception devices positioned out of the predetermined area.

12. An information processing apparatus according to claim 10, characterized by further comprising notifying means for providing the information on the information transmission/reception device determined as the device having been left within the predetermined area by the security condition selecting means to the information transmission/reception devices positioned out of the predetermined area.

13. An information processing apparatus according to claim 9, characterized in that:

when at least one of the plural information transmission/reception devices positioned within the predetermined area moves from the inside of the predetermined area to the outside of the predetermined area, the security condition selecting means requires response from the information transmission/reception devices positioned within the predetermined area for the predetermined period and judges the information transmission/reception device from which no response is given as the information transmission/reception device having been left behind.

14. An information processing apparatus according to claim 10, characterized in that:

when at least one of the plural information transmission/reception devices positioned within the predetermined area moves from the inside of the predetermined area to the outside of the predetermined area, the security condition selecting means requires response from the information transmission/reception devices positioned within the predetermined area for the predetermined period and judges the information transmission/reception device from which no response is given as the information transmission/reception device having been left behind.

15. An information processing apparatus according to claim 11, characterized in that:

when at least one of the plural information transmission/reception devices positioned within the predetermined area moves from the inside of the predetermined area to the outside of the predetermined area, the security condition selecting means requires response from the information transmission/reception devices positioned within the predetermined area for the predetermined period and judges the information transmission/reception device from which no response is given as the information transmission/reception device having been left behind.

16. An information processing apparatus according to claim 12, characterized in that:

when at least one of the plural information transmission/reception devices positioned within the predetermined area moves from the inside of the predetermined area to the outside of the predetermined area, the security condition selecting means requires response from the information transmission/reception devices positioned within the predetermined area for the predetermined period and judges the information transmission/reception device from which no response is given as the information transmission/reception device having been left behind.

17. An information processing apparatus according to claim 13, characterized in that:

when the security condition selecting means determines any of the information transmission/reception devices as the device having been left behind, the security condition selecting means does not cancel the security condition until receiving a command for canceling the security condition given from any other information transmission/reception device.

18. An information processing control system, comprising:
the information processing apparatus according to claim 1; and
information transmission/reception devices for communicating with the information processing apparatus.

19. An information processing control system, comprising:
the information processing apparatus according to claim 9; and
information transmission/reception devices for communicating with the information processing apparatus.

20. A control method of an information processing apparatus for monitoring movement of users each carrying an information transmission/reception device into and out of a predetermined area and for controlling security operations for the predetermined area, characterized by comprising:

a communication step for communicating with each of the plural information transmission/reception devices;

a position recognition step for acquiring position information on the respective positions of the plural information transmission/reception devices;

a record storage step for storing position record information showing a record of the position information for a predetermined period;

a position judging step for judging whether each of the information transmission/reception devices is located within the predetermined area based on the position information;

a first security command step for commanding setting or canceling of a security condition based on the judgment result given in the position judging step;

a second security command step for receiving information on the requirement for setting or canceling of the security condition from the information transmission/reception devices through the communication unit, and for commanding setting or canceling of the security condition; and a security condition selecting step for selecting either the command by the first security command step or the command by the second security command step based on the position record information.

* * * * *